(12) United States Patent
Bunker

(10) Patent No.: US 6,371,250 B1
(45) Date of Patent: Apr. 16, 2002

(54) DISC BRAKE SYSTEM WITH ABS

(75) Inventor: Kenneth J. Bunker, Leicester (GB)

(73) Assignee: Delphi Technology, Inc., Troy, MI (US)

( * ) Notice: Subject to any disclaimer, the term of this patent is extended or adjusted under 35 U.S.C. 154(b) by 0 days.

(21) Appl. No.: 09/878,548

(22) Filed: Jun. 11, 2001

Related U.S. Application Data

(63) Continuation of application No. 09/335,304, filed on Jun. 17, 1999, now Pat. No. 6,244,391, which is a continuation-in-part of application No. 09/303,183, filed on Apr. 30, 1999, now Pat. No. 6,247,560, which is a continuation-in-part of application No. PCT/GB97/03388, filed on Dec. 8, 1997, which is a continuation-in-part of application No. PCT/GB97/03386, filed on Dec. 8, 1997.

(30) Foreign Application Priority Data

| Dec. 12, 1996 | (GB) | 9625853 |
|---|---|---|
| Dec. 12, 1996 | (GB) | 9625854 |
| Dec. 12, 1996 | (GB) | 9625861 |

(51) Int. Cl.$^7$ ................................................. B62D 7/18
(52) U.S. Cl. ..................... 188/18 A; 188/71.5; 188/141
(58) Field of Search ............................. 188/18 A, 71.5, 188/72.4, 72.7, 73.38, 106 F, 141, 355, 358, 359; 303/2

(56) References Cited

U.S. PATENT DOCUMENTS

| 2,943,827 | A | * | 7/1960 | Hartel et al. ................. 244/111 |
|---|---|---|---|---|
| 3,146,860 | A | * | 9/1964 | Wilson ........................ 188/72 |
| 3,208,559 | A | * | 9/1965 | Chambers et al. ........... 188/264 |
| 3,475,059 | A | * | 10/1969 | Klein .......................... 303/9.69 |
| 3,494,448 | A | * | 2/1970 | Ryprecht et al. .............. 188/73 |
| 3,724,605 | A | * | 4/1973 | Naismith et al. .......... 188/71.8 |
| 3,776,607 | A | * | 12/1973 | Alderton ..................... 303/22.5 |
| 3,788,429 | A | * | 1/1974 | Brooks et al. ................ 188/18 |
| 3,941,221 | A | * | 3/1976 | Pringle ........................ 188/218 |
| 4,256,209 | A | * | 3/1981 | Lupertz ........................ 188/218 |
| 4,474,060 | A | * | 10/1984 | Crossman .................... 188/218 |
| 4,576,255 | A | * | 3/1986 | Mery et al. .................. 188/71.5 |
| 4,588,205 | A | * | 5/1986 | Gaiser ......................... 188/141 |
| 4,598,799 | A | * | 7/1986 | Thioux ........................ 168/71.5 |
| 4,743,045 | A | * | 5/1988 | Yoshida ....................... 280/703 |
| 4,844,206 | A | * | 7/1989 | Casey .......................... 188/18 |
| 4,865,160 | A | * | 9/1989 | Casey ....................... 188/18 A |
| 4,995,483 | A | * | 2/1991 | Moseley et al. .......... 188/18 A |
| 5,069,314 | A | * | 12/1991 | Madzgalla et al. ...... 188/73.36 |
| 5,472,068 | A | * | 12/1995 | Weiler et al. ............ 188/73.44 |
| 5,897,130 | A | * | 4/1999 | Majeed et al. ........... 280/5.507 |
| 5,931,268 | A | * | 8/1999 | Kingston et al. ........... 188/162 |

FOREIGN PATENT DOCUMENTS

| DE | 2039003 | * | 2/1971 |
|---|---|---|---|
| DE | 2739128 | * | 3/1979 |
| GB | 1359487 | * | 7/1974 |
| GB | 1396503 | * | 6/1975 |
| GB | 2015122 | * | 2/1978 |
| GB | 2049845 | * | 12/1980 |
| GB | 2076087 | * | 11/1981 |
| GB | 2184801 | * | 7/1987 |

* cited by examiner

Primary Examiner—Christopher P. Schwartz
(74) Attorney, Agent, or Firm—Fitch, Even, Tabin & Flannery

(57) ABSTRACT

An ABS brake system employs two axially slidable brake discs and four brake pads that are biased to have floating light random contact therebetween in the off brake position. The ABS controller operates the brake pads with about one half of the usual brake pressure and about double the number of the usual braking and release cycles. The floating axially slidable brake discs and four brake pads have reduced residual torque drag during the brake release cycle and have reduced hystersis. The result is operation at a higher frequency and with less amplitude, than the usual sliding caliper and fixed brake system, and a resolution of a modulating scale for cycling that is usually associated with a much lower coefficient of friction surface than is actually present.

26 Claims, 16 Drawing Sheets

DISC BRAKE SYSTEM WITH ABS

This is a continuation, of prior application Ser. No. 09/335,304, now U.S. Pat. No. 6,244,391 filed Jun. 17, 1999, which is a CIP of U.S. Ser. No. 09/303,183, now U.S. Pat. No. 6,247,560 filed Apr. 30, 1999, which is hereby incorporated herein by reference in its entirety. which is a CIP of PCT/GB97/03388 filed Dec. 8, 1997, which is a CIP of PCT/GB97/03386 filed Dec. 8, 1997.

FIELD OF THE INVENTION

This invention relates to an ABS braking system for motor vehicles.

BACKGROUND OF THE INVENTION

Typically, production vehicles, such as automobiles having a Automatic Braking System (ABS) employ a single brake disc fixed to the wheel hub and a sliding brake caliper mounted on a suspension member of the vehicle. Operation of a brake foot pedal by the operator with excessive force is sensed by a sensor, and a deceleration of the wheel is sensed by a wheel position or speed sensor mounted adjacent the wheel. The wheel speed sensor particularly monitors for front wheel locking up while in the braking condition with its loss of steerability and its longer stopping distance. The stopping distance of the vehicle may be made shorter if the wheels are operated iteratively at a low slip rather than a longer, fully locked or skid condition. The brake caliper is preferably operated at a high brake torque "apply" rate to increase brake torque for quick response. Additionally, caliper preferably is operated at a "high release" rate to decrease brake torque for quick response when the condition of lock-up is sensed as about to begin to allow the wheel to accelerate to a velocity approaching the vehicle velocity.

In conventional production vehicles having this fixed brake disc and slidable brake caliper, a hydraulic piston in a hydraulic cylinder on the caliper is operated to shift an inner movable brake pad into braking engagement with one side of the brake disc fixed to a rotating wheel hub mounted on the vehicle suspension. A reaction force from the hydraulic fluid moving the piston shifts the slidable caliper to slide the caliper and a second brake pad on the distal end of a caliper into engagement with the other side of the fixed brake disc. Typically, the braking system operates with hydraulic fluid at a pressure of about 70 BAR or more to provide the clamping pressure to opposite sides of the brake disc.

From the foregoing, it will be understood that when high excessive force is applied to a brake pedal by a vehicle operator causing rapidly deceleration of the wheel towards the lock-up condition, the ABS sensors and control system senses the rotational position of the wheel relative to the vehicle's speed; and if these conditions are within preset stored parameters, the ABS hydraulic system is activated to operate the brakes. The ABS hydraulic system isolates the pedal-operated hydraulics, and the braking operation is taken over by the ABS system, which causes the braking effort to drop and allows the wheel rotation to accelerate or spin up. When the wheel spin-up approaches the vehicle speed, as sensed by the wheel sensor, but does not equal the vehicle speed, the ABS hydraulics apply increased hydraulic pressure to the sliding caliper to decrease or spin down the braked wheel's rotational velocity. When the vehicle wheel spins down to approach vehicle lock as sensed by the wheel sensor and within the preset parameters, the ABS hydraulic pressure at the slidable caliper is increased to allow wheel spin up. This process is iterated to provide modulation of the ABS hydraulic pressure and a deceleration of the vehicle's velocity to provide a stopping of the vehicle within a predetermined distance depending on the kind of surface on which the wheels are engaging. Manifestly, the stopping distance on ice or other low coefficient of friction surfaces is greater than the sloping distance for higher coefficient of friction surfaces. Governmental regulations in many countries require the ABS braking system to stop the vehicle within a set stopping distance for a given coefficient of friction surface.

The ABS system senses the initial apply rate and release rates and scales or calibrates the resolution of subsequent "apply" and "release" rates to stop the vehicle. For example, the amplitude of the initial apply and release rates is quite high when the wheel is on a dry concrete surface and the frequency of the brake applications and releases is quite large in amplitude and at a low frequency. The ABS system then compares the frequency and amplitude of brake apply and brake release rates relative to the preset stored parameters in a controller and then operates the braking system according to this algorithm that is used to decelerate the vehicle's speed to stop the vehicle with the governmental stopping distance. This deceleration is usually a constant deceleration and is linear with respect to time and vehicle velocity or distance traveled. Hereinafter, this will be called a vehicle deceleration curve, which need not be linear, but which is usually a linear curve. A graphical representation of vehicle wheel speed and of hydraulic pressure shows that they are modulated along this theoretical vehicle deceleration curve until the vehicle is slowed down to a very low speed, e.g., under 10 mph when the brakes are allowed to lock up to complete the stopping of the vehicle. If the same vehicle traveling at the same speed and braked with the same brake pedal pressure was traveling on polished ice, having a very low coefficient of friction, relative to the coefficient of friction for the concrete surface, the initial braking by the ABS system recognizes this and sets the scale or calibration to generate a finer resolution with a more frequent application and release of the brakes and with a smaller amplitude of wheel acceleration and deceleration. Thus, with a smaller coefficient of friction surface, the average pressure variation and wheel acceleration is less over the stopping distance.

Current ABS braking systems suffer from being relatively heavy in weight, in being relatively costly, and from operational deficiencies such as operating at high pressures, high residual torque drag, and large hysteresis losses. The present invention is directed to providing a significant weight reduction, for example, with respect to one commercial automobile, to reduce the weight of the braking system from about 18 kilograms to 15 kilograms of unsprung weight at the wheel. A cost saving of thirty (30%) percent or more can be achieved relative to the braking system currently used on a commercial vehicle. As will be explained in detail hereinafter, better operation is achieved with a reduction in residual torque drag, which occurs when the brake pads rub against the brake disc when the brake pedal has not been operated. A reduction in residual torque drag results in a significant increase in brake pad life, lower operating temperatures, and faster wheel acceleration as will be described in more detail hereinafter.

To facilitate acceptance and adoption of the braking system of this invention by original equipment manufacturers, the preferred braking system of this invention may be used with the same installed ABS controller and operating system on vehicles now in use. The preferred braking system without the ABS control system is more fully described in the aforesaid co-pending United States patent application and to a lesser extent hereinafter in this application. This braking system includes twin slidable brake discs and four brake pads for rubbing or clamping engagement with the four sides on the twin brake discs and a fixed caliper mounted on a suspension stub axle or knuckle. Preferably, the hydraulic cylinder for operating the brake discs is formed integrally with the suspension knuckle; and an outer, distal brake pad is fixedly mounted on a stationary bridge of the caliper. This is unlike the current slidable caliper on the typical conventional disc brake that has only two rubbing surfaces engaging opposite sides of a cast iron or cast aluminum, heavy brake rotor.

The present invention is, as stated above, directed to providing a better ABS system from an operational standpoint. Current ABS systems suffer from a number of shortcomings. One of these shortcomings is that they operate at relatively high hydraulic pressures, for example, 70 BAR on high friction surfaces. With only two braking surfaces for a wheel, a large amount of energy must be dissipated at each rubbing surface to decelerate the vehicle quickly. These high brake pressures result in large amplitude variations in hydraulic pressure when the brakes are being applied and released, During the long period of time that the brake pressure is released to allow wheel acceleration toward the vehicle's velocity, the vehicle is moving forwardly with no braking effort being applied to decelerate the vehicle.

With a finer resolution of the frequency and amplitude about a theoretical, vehicle braking curve, the time for an individual cycle of brake application and brake release is much quicker so that many more of these cycles are performed in the same period of time than for higher resolution braking system. Hence, it would be desirable to have an ABS system with increased resolution ore closely approximating the vehicle's deceleration curve. Another factor involved in the obtaining of better braking and, also in obtaining finer resolution of braking and releasing cycles is that of the hystersis of the system, which involves wasted energy and time put into the system. For example, in the current hydraulic systems there are expandable, flexible, hydraulic hoses or lines that expand during the high pressure braking and contract during the lower pressure release of the brakes. Also, several seals are expanded during high pressure braking and then contract during the pressure release. One such seal in a hydraulic braking system is the annular seal about the piston of the brake caliper's cylinder. This seal is expanded during braking and contracts during brake release and exerts a return force to return the piston.

Another operational shortcoming of the commonly used slidable caliper, single disc braking system is the amount of deflection of the distal brake pad's support at an outer end of the caliper. That is, in the current disc braking system, the large, heavy sliding caliper has a fixed pad on the caliper which is that outer end of a caliper bridge. This caliper and its bridge are large and heavy because they carry the piston and the outer distal pad and provide the stiffness needed to resist bending and deflection from the large clamping forces being applied. Despite its being relatively heavy and large, the caliper's distal end often deflects about 0.0006 inch or greater. The operation in the system is affected by this deflection of the caliper's distal end and the time needed to slide the heavy caliper back to its brake release position.

As stated above, the operational performance of an ABS disc brake system is adversely affected by residual drag of the brakes when the braking pressure has been released. Residual braking torque retards wheel spin up to the desired speed, and thus, slows the time of response. It has been found that the conventional slidable caliper brake disc herein described has significant residual torque or brake drag. One cause may be that the brake disc is fixed to a stub and whatever tolerance it has from a true perpendicular relationship to the rotational axes of the wheel results in rubbing of the disc at high spots, which is called "run out". That is, the fixed disc or rotor will not run absolutely true because you have manufacturing tolerances in its support including bearings, hubs or axles, and in the disc itself, which is cast with angular portion therein. This rotating fixed rotor has a geometry envelope within which its annular braking surface travels during a wheel revolution. When a high spot on the rotor hits or rubs against a brake pad, it pushes against the high mass, caliper, and residual torque drag is the result. This reduces the life of brake pads and wastes fuel and energy. Also, as the wheel is released by the ABS system to accelerate toward the vehicle velocity, the wheel must overcome this residual torque drag as it accelerates. This residual torque drag prolongs the time needed to reach the desired wheel velocity and thus, increases the stopping distance for the ABS braking system. That is, the higher hydraulic operating pressures and mass of the sliding caliper and associated friction losses of this sliding caliper system result in more time betweens spin down and spin up. Hence, it would be desirable to provide a more effective ABS system wherein the frequency of spin up and spin down is faster.

To provide an effective ABS braking system, the brake system itself must pass rigorous specifications for wear, vibration, residual torque as well as various road tests for brake fade, for temperature of operation on mountainous descents or curvy roads over long period of time, etc. Some of the current brake systems using two brake pads and a single fixed brake disc operate at such high temperatures they either fail or are having difficulty in passing the Auto Motive Standard (AMS) road test.

Additionally, for a brake system to be installed on production vehicles, it must operate successfully and be free of vibrations, noise or other adverse feel conditions that are deemed undesirable by the vehicle operator. Of course, longevity of the brake pads and discs with a minimum of wear at localized areas that results in disc thickness variation (DTV) is most desirable to avoid vibrations and replacement of brake discs and/or brake pads. In an off-brake condition, the brake pads and brake disc can touch, particularly when cornering or traveling over bumpy surfaces and cause residual torque drag. This residual torque drag is additional to that above-described due to manufacturing tolerances.

SUMMARY OF THE INVENTION

In accordance with the present invention, there is provided a new and improved ABS braking system for vehicles that is lighter in weight, lower in cost and has improved operating characteristics. To achieve these ends, the preferred ABS system is formed with a pair of slidable, thin brake discs, which are mounted in a floating manner on a wheel hub and this floating allows the brake discs to position themselves quickly and with reduced, residual brake torque. From a weight standpoint, these brake discs are thin, flat plates made of steel, aluminum or a composite material as contrasted to the heavy cast, angular rotors currently used. The hydraulic brake cylinder is integrally formed inside the stub axle or knuckle to provide a significant weight savings. From an operational standpoint, the ABS system works at substantially reduced hydraulic pressures and has a higher frequency of wheel deceleration and accelerations, and lower amplitude of pressure and wheel velocities than that of the conventional ABS system. Thus, there is provided an ABS braking system operating at a lower pressure, with reduced hystersis, and improved modulation of braking relative to a conventional, production ABS system which was a slidable caliper and a pair of brake pads cooperable with a single, fixed brake disc.

This is achieved by employing with the ABS electronic controller systems a braking system using four rubbing or braking surfaces and two slidable discs, a lighter and smaller caliper, greater caliper stiffness, reduced hystersis and lower operating forces.

In accordance with the invention, the preferred ABS braking system, when used on a conventional vehicle having a standard ABS controller, develops from the initial application of the braking application a resolution of modulating scale for cycling that is associated with a much lower coefficient of friction surfaces than is actually present. That is, the same ABS controller on a high coefficient of friction road surfaces operates the conventional, fixed, single brake disc system in the manner associated with this high coefficient of friction surface but operates the twin, slidable brake disc system in the manner associated with a much lower coefficient of friction, road surface. This is a result of using the slidable pair of brake discs and four brake pads operating at about one half of the usual hydraulic pressure and having reduced residual torque drag and hystersis such that the initial cycles used to scale or calibrate the modulators is one half or less than that used for the conventional sliding caliper and fixed disc kind of system. Stated differently, when using a conventional ABS system controller and hydraulic master cylinder system connected to the preferred turn, slidable base discs and four brake pads, the system will provide more than double the number of braking and release cycles per unit time. The braking and release cycles will have a much higher frequency and a substantial less amplitude meaning that the vehicle will be decelerating more closely to the desired vehicle deceleration curve set by the ABS controller.

In accordance with an important aspect of the invention, the slidable brake pads are mounted upwardly at about a 12:00 o'clock position with a wheel speed, pulse generator located adjacent thereto so as not to interfere with the locking angle and turning circle of the vehicle suspension. Preferably, the hydraulic cylinder is integrally formed at the top of the suspension member. Also, it is preferred to provide the seal ring between the piston and the cylindrical wall of the cylinder with a low friction surface, such as a Teflon surface, to reduce hystersis.

In the preferred embodiment, the wheel speed pulse generator includes an annular air cooling ring attached to the rotatable hub with equally spaced tabs arranged in a circle concentric with the wheel axle. A magnetic sensor is mounted on the suspension member adjacent the fixed caliper to sense the spaced tabs and thereby, the rotational speed of the wheel relative to lock-up and/or vehicle speed.

DETAILED DESCRIPTION OF THE PREFERRED EMBODIMENT

Figure 1A:
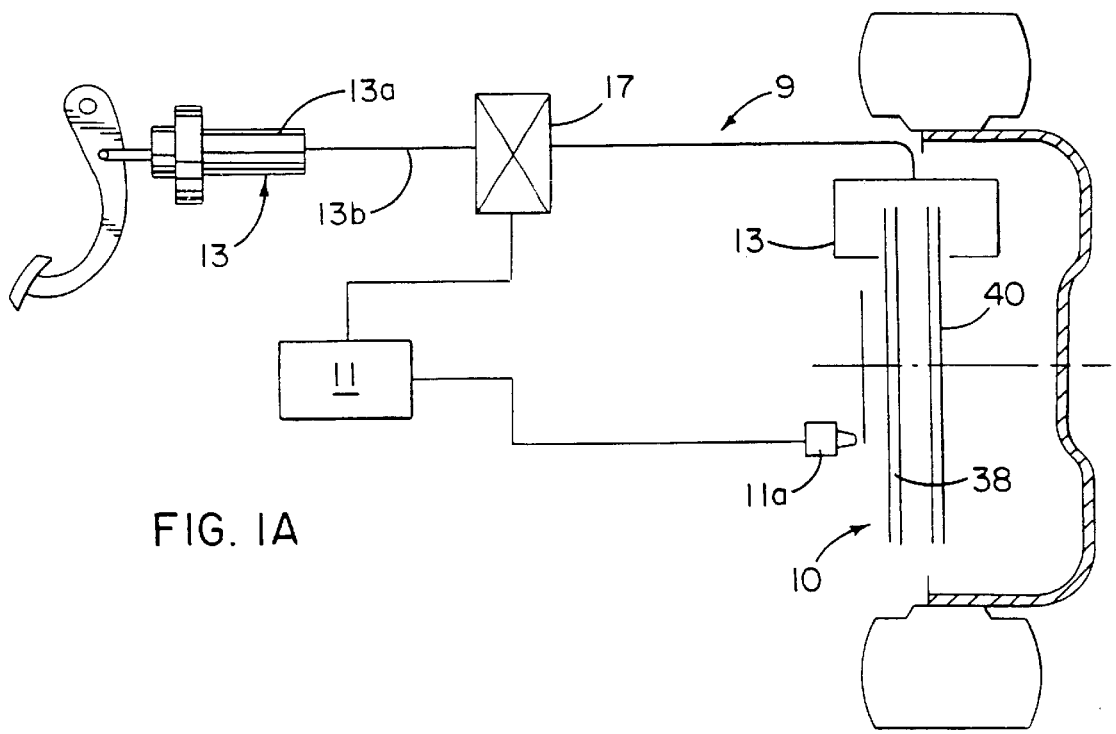
FIG. 1A is a diagrammatic view of a twin braking ABS system embodying the invention.
Figure 1G:
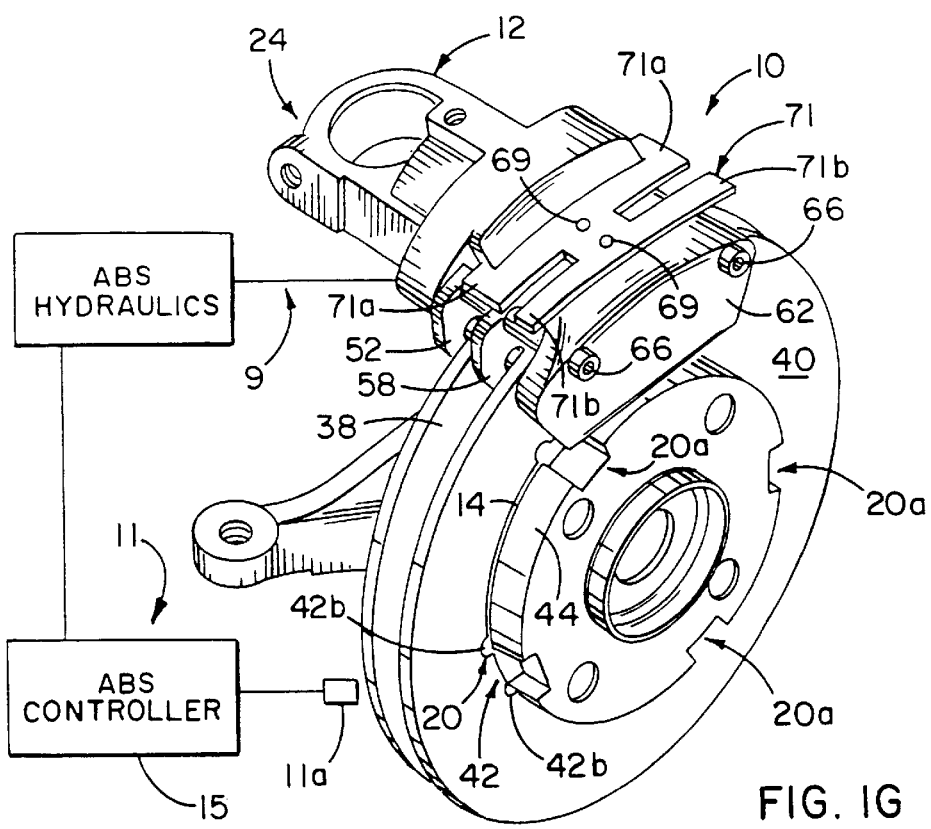
FIG. 1G illustrates an ABS system for operating the preferred twin disc brake assembly.

As shown in the drawings for purposes of illustration, the invention is embodied in an ABS braking system 9 (FIG. 1A) having an electronic control unit 11 controlling a hydraulic system connected to a force actuator 13 which supplies the actuating force used to operate a braking disc assembly 10 having a pair of brake discs 38 and 40 which are braked decelerated by clamping forces from four braking pads 50, 54, 56 and 60 (FIG. 1G). The illustrated braking assembly will be described in connection with the illustrated embodiment of the invention wherein the braking system is for a front wheel (not shown) of a front wheel-drive car. The ABS controlled braking system of this invention may be applied to any vehicle whether front or rear wheel drive and to the rear wheel brakes as well as the front wheel brakes.

Figure 1B:
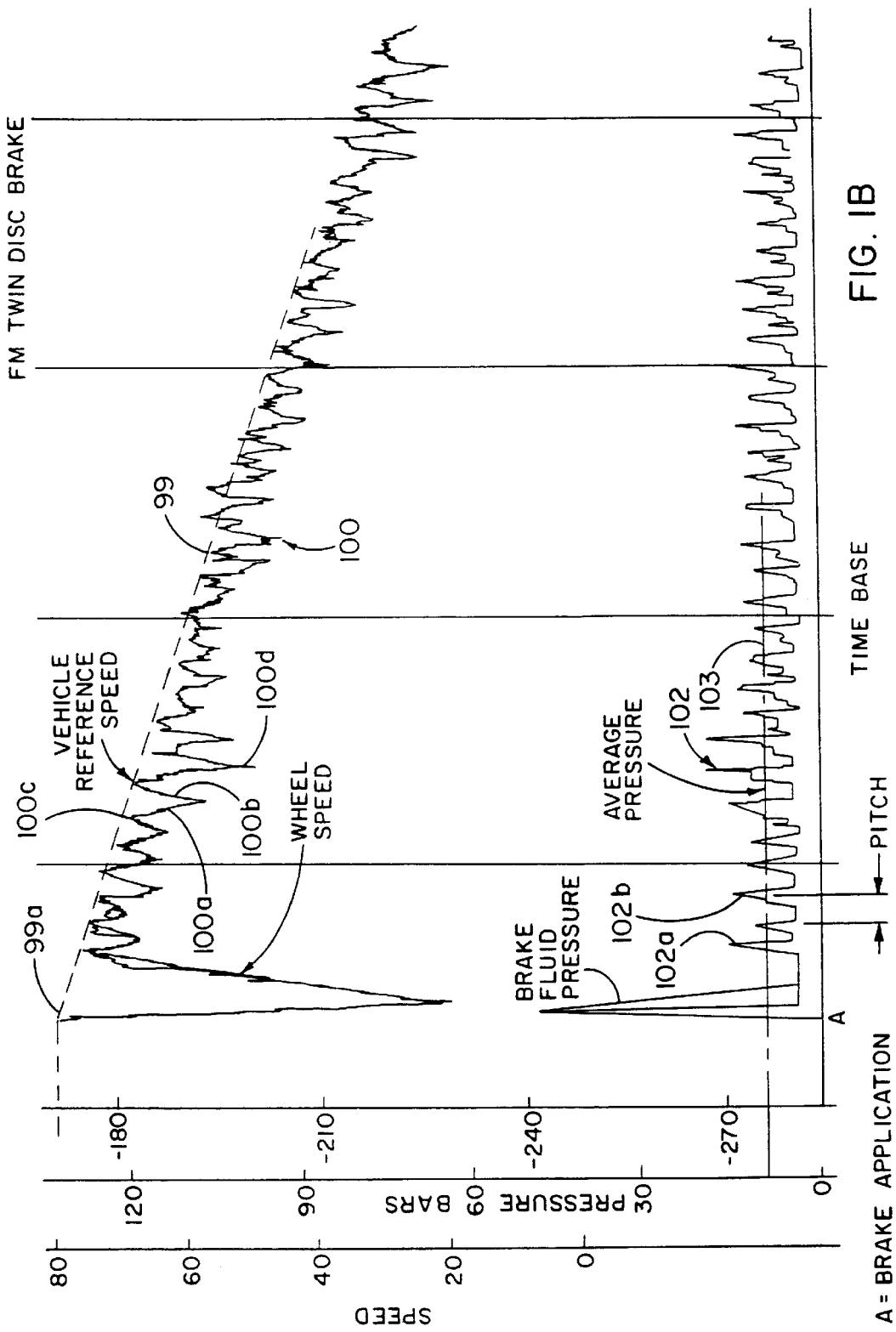
FIG. 1B is a graph showing operational characteristics of the ABS braking system of FIG. 1A applied to an automobile and embodying the invention.
Figure 1C:
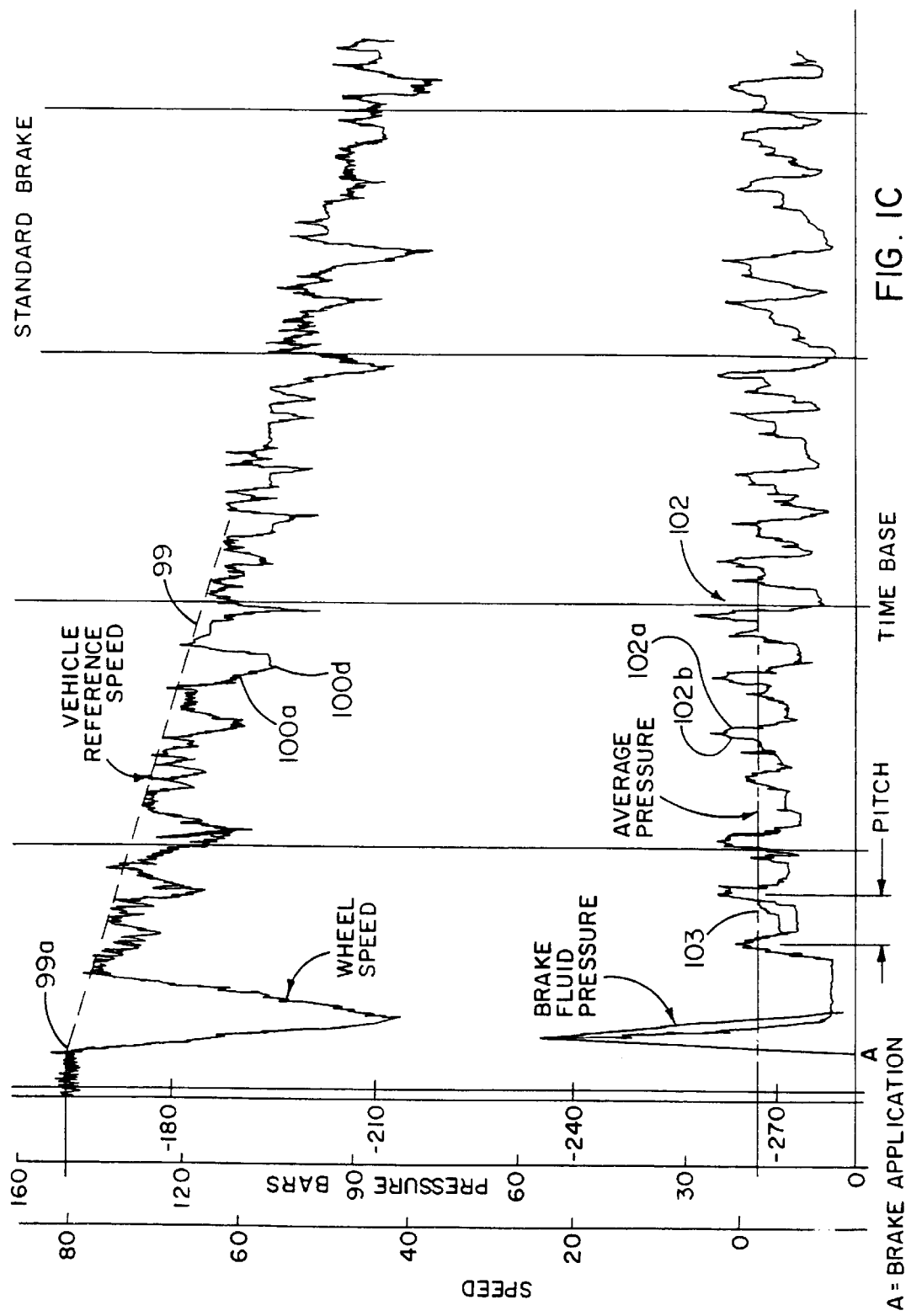
FIG. 1C is a graph showing operational characteristics of a conventional ABS braking system on the same vehicle used for FIG. 1A.

The ABS braking system 9 of this invention employed the slidable pair of brake discs 38 and 40 and the cooperating four braking pads 50, 54, 56 and 60 and employed a conventional ECU 11 provided on a production automobile. The braking system was tested on various combinations of road surfaces including, but not limited to, road surfaces with a very low coefficient of friction, such as polished ice, as well as normal dry road surfaces and combinations thereof. An ABS controller 15 develops a theoretical vehicle reference speed which is depicted herein as a substantially linear deceleration curve 99 (FIGS. 1B and 1C) for the stopping distance depending upon a number of factors including the vehicle's velocity and the coefficient of friction for the surface engaging a wheel or wheels. Typically, each wheel is separately controlled as one or the other of the wheels made by a lower efficient surface such as ice while another wheel may be on dry pavement with a high coefficient of friction. In the example illustrated in FIG. 1B for the twin braking disc assembly of this invention, the vehicle was traveling at 80 kilometers per hour and then the brakes were applied very hard. The vehicle's wheel speed is sensed during the deceleration of the vehicle and is depicted in FIGS. 1B and 1C, as an acceleration/deceleration curve 100. This wheel speed acceleration/deceleration curve 100 has alternating wheel deceleration portions 100a and wheel acceleration portions 100b. Thus, will be seen from curves 100 on FIGS. 1B and 1C that the ABS control system applies brake shoes against the brake discs and releases the braking force iteratively to decelerate the wheel and then to release the brakes to allow the wheel to accelerate towards the vehicle velocity. Herein, the curve 100 is substantively linear from an upper left end 99a where the vehicle is traveling at 80 kph until it is stopped at a lower right end portion 99b on the curve 99. The horizontal axis of the graph is in time based units that can be with the vehicle having been stopped after so many units of travel time.

Thus, the wheel acceleration/deceleration curves 100 each show the wheel being decelerated along the downward sloping portion 100a when the brakes are applied and an ascending portion 100b, as the wheel brakes are released and the wheel is allowed to acceleration toward the vehicle velocity, which is slightly less than the vehicle reference speed, as shown by the curve 99 immediately thereabove. A brake apply and release cycle generates a deceleration beginning at a higher wheel velocity 100a and continuing to the lowest wheel 100d and then the curve shows the wheel velocity rising along curve portion 100b to another maximum wheel velocity 100c to initiate the brake apply and release cycle.

The graph of FIG. 1C was generated during the braking of a production vehicle employing the single fixed disc or rotor and a slidable caliper (not shown) having a pair of brake discs. Similar reference characters have been used on the curves of FIGS. 1B and 1C to designate the same things such as deceleration, acceleration, vehicle velocity, pressure of hydraulic fluid and the time or distance traveled. The conventional sliding caliper and single brake rotor on the test vehicle were replaced with the braking assembly having the twin discs and four braking pads illustrated here. The same ABS controller system was used to operate the conventional braking system as well as the twin disc braking system illustrated and described herein. The curves of FIGS. 1B and 1C were generated for a pair of front wheels on a low coefficient of friction surface, viz. polished ice. Other data were generated for high friction surfaces and a combination of low and high friction surfaces.

Brake fluid pressure curves 102 are also provided in FIGS. 1B and 1C to show the hydraulic pressure during each brake apply and release cycle. The downwardly sloping portion 102a shows a dropping fluid pressure as the brakes are released and shows an ascending fluid pressure portion 102b as the brakes are applied. For each iterative brake apply and release cycle the fluid pressure descends as the wheel accelerates toward vehicle speed and then the fluid pressure ascends as the wheel is decelerated toward the wheel locking condition. An average fluid brake pressure line 104 is also shown in FIGS. 1B and 1C. The brake pressure is modulated as by a hydraulic modulating valve 17 (FIG. 1A). When the wheel deceleration exceeds the vehicle deceleration by a defined amount the ECU 11 signals the pressure modulating valve to modulate and reduce the line pressure. When the wheel accelerates and at a defined point, the ECU 11 signals the modulating valve 17 to restore line pressure.

Figure 1D:
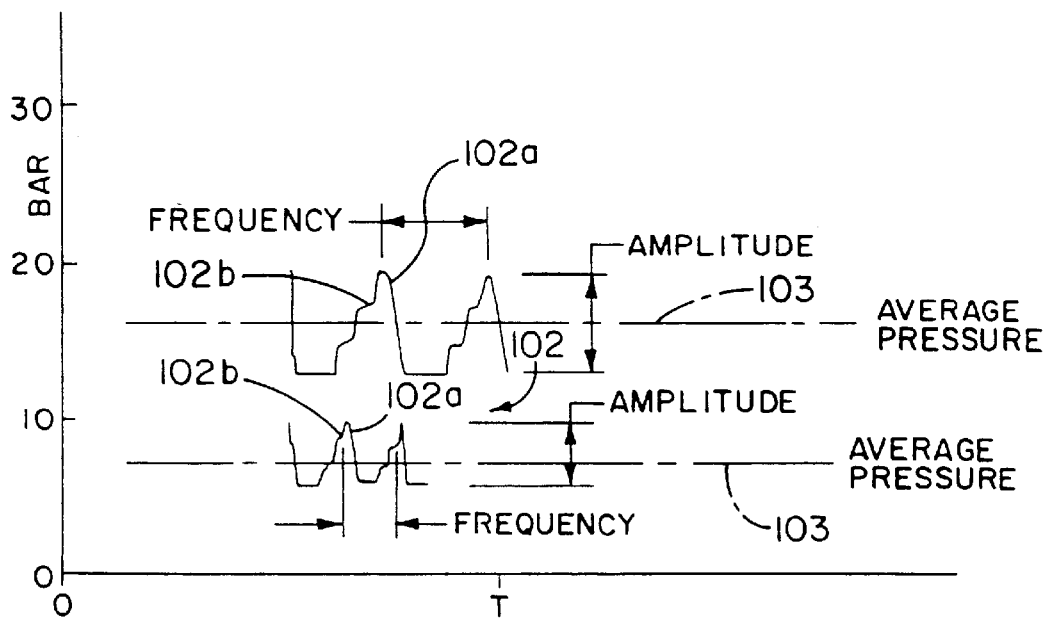
FIG. 1D illustrates a pressure reduction by about one-half and an about doubling of frequency of brake application and release between the twin ABS system of this invention and the conventional ABS system.

In accordance with the present invention, there is provided an ABS braking system having a finer resolution or frequency of brakes apply and release cycles and with the cycles being of less amplitude for wheel acceleration/deceleration. Additionally, the present invention provides a reduction in fluid pressure by about one-half, as can be seen from a comparison of the average fluid pressure curves 103 of FIGS. 1B, 1C and 1D, which is desirable from a hystersis standpoint where the expansion and contraction of seals and expandable fluid hoses takes time and energy. While the same amount of energy is needed to stop the vehicle, more energy and time is wasted due to hysteresis. In addition to a substantial reduction in pressure, it can be seen from a comparison of the respective pressure cycles, as depicted in FIG. 1D, that the amplitude of pressure changes is substantially smaller for the ABS twin brake system than for the amplitude of pressure changes for the conventional braking system. Additionally, the fluid pressure cycles are more frequent for the twin brake ABS system than for the conventional ABS system, as depicted in FIG. 1D.

As will be explained in greater detail hereinafter, in the twin brake ABS system, the wheel accelerates faster towards vehicle speed during wheel spin-up portion 100b because of a significantly less residual torque drag from the twin disc and four brake system 10 as compared to the conventional single, fixed rotor and slidable caliper. This residual brake drag is present during the wheel spin-up while the brake is in the release mode to retard the wheel acceleration.

Figure 2:
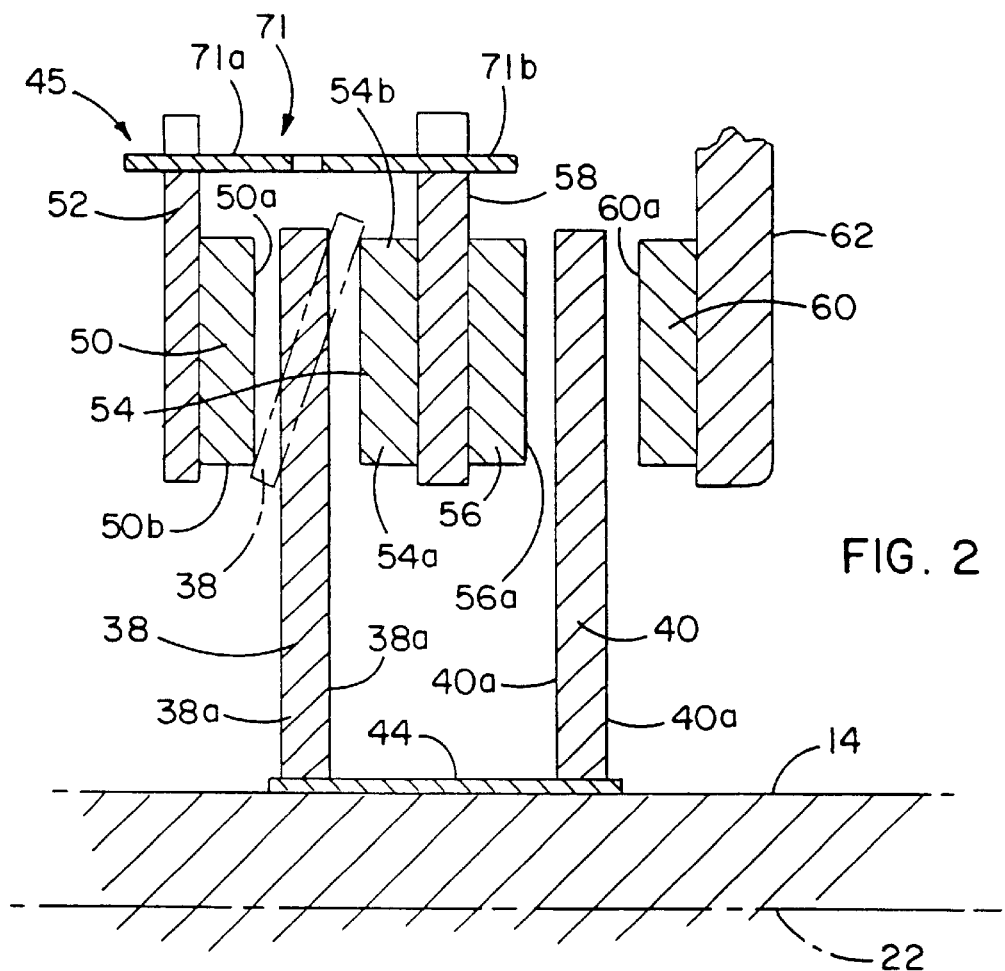
FIG. 2 is a diagrammatic view of an outer spring constraining the brake pads and an inner spring constraining the brake discs.
Figure 3:
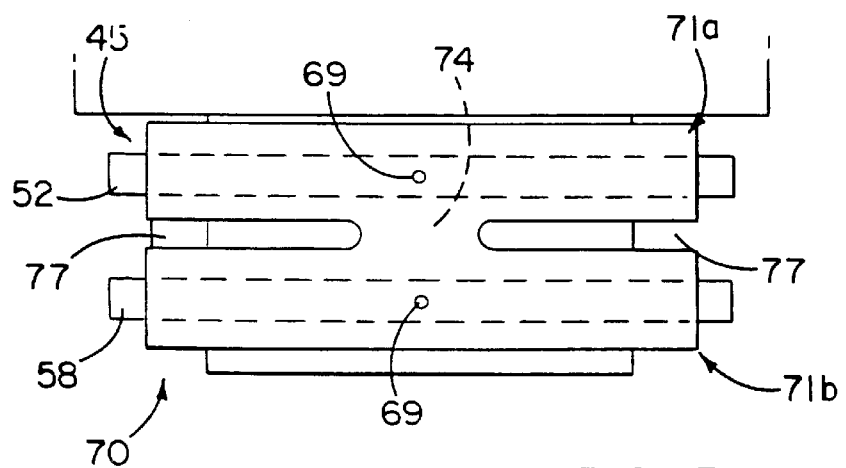
FIG. 3 is a plan view showing the spring constraining the brake pads.

From weight and cost standpoints, it is preferred to provide an integral hydraulic cylinder 72 (FIG. 5) formed in the stub axle 12 with a piston 14 therein; thin slidable flat brake discs 38 and 40 of steel; and a smaller fixed caliper carrying the brake pads 50, 54, 56 and 60. Significant weight reductions for example from about 18 kilograms to 15 kilograms has been achieved in this example. Further cost and weight savings are achievable by using lighter weight and/or smaller seals and hoses because the reduction of about 50% in the operating pressure between the two ABS systems (FIGS. 2 and 3). A reduction of 3 kilograms or more of unsprung weight at the wheels which transmit vibrations, noise and harshness back into the vehicle is an important and significant contribution. Thus, it will be seen that the present invention provides an ABS system which is lower in cost, lighter in weight, and operates more efficiently than the conventional ABS system to which it is being compared herein. The present invention is compatible with existing ABS control systems using existing algorithms for the conventional caliper system. Improved braking can be obtained with use of a new algorithm that utilizes the higher frequency and lower amplitude more efficiently than the algorithm developed for this conventional, higher pressure, ABS controller. The finer resolution in a sense reduces the "hunting" of the pressures about a center line or average line for the pressure changes shown in these graphs. Because of the finer resolution, it also may be desirable to increase the sampling rate, for example, by doubling the number of input elements around the wheel that are being sensed by a sensor, such as a Hall effect type of sensor 11a (FIGS. 1A and FIG. lG) to provide double the number of input signals to the ECU. Further, the input signals may be further magnified, and the flat bottom of a current signal may be processed to give a finer resolution of pressure variation at the changeover from a decreasing pressure to an increasing pressure at the brake pads. This additional information could be of use in the new algorithm.

Figure 18:
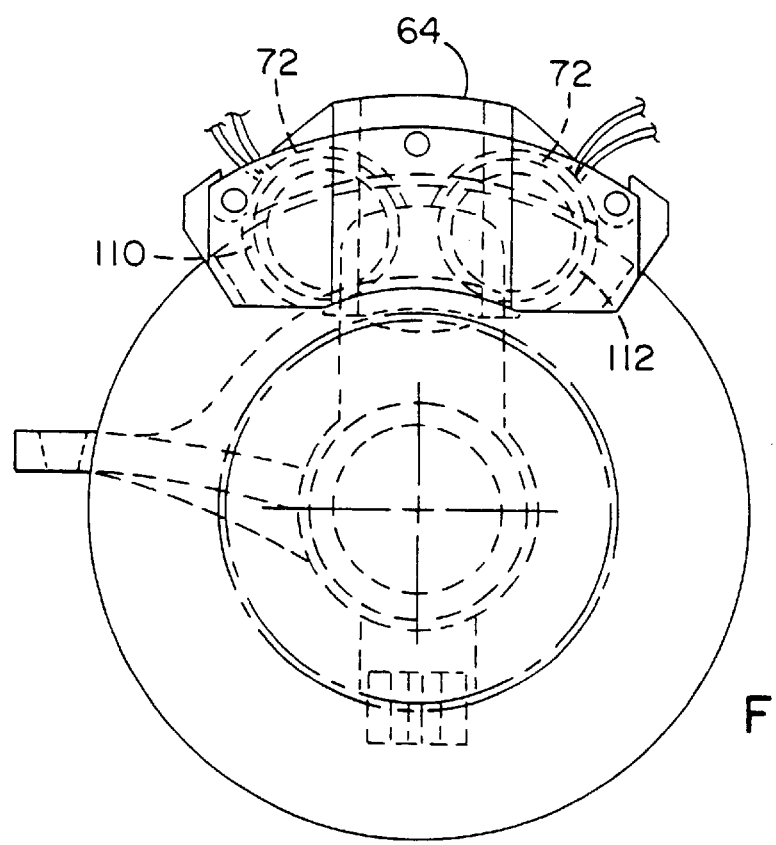
FIG. 18 is a view showing two solenoids to operate the brake pad carriers.

In accordance with an important aspect of the invention, the reduction in pressure being used to generate the braking clamping force over four clamping surfaces rather than two clamping forces allows the use of a solenoid 110 (FIG. 1F) to operate the brakes rather than the conventional rotary electrical motors with gear trains to provide a mechanical advantage. That is, as illustrated in FIGS. 1F and 18, a solenoid 110 or a pair of solenoids 110 and 112 may be used to provide the force for actuating the brakes at a force equivalent to 20 Bar or about 10 Bar if a pair of hydraulic cylinders are provided in the stub axles, as illustrated in FIG. 18.

From the date developed with the test vehicle, there was found to be a reduction in pressure from about 70 BAR to 35–40 BAR for high coefficient road surfaces. On low coefficient of friction road surfaces, such as ice, the conventional caliper system operated in a range of 15–20 BAR of line pressure while the twin brake system operated at 6–10 BAR of line pressure. The frequency was about double in each instance, and the amplitude of pressure variation was about halved. This is with the use of a single cylinder 72 rather than a pair of cylinders, which should allow a further reduction by about one-half, if such a lower pressure system is desired. These lower pressures are most useful for brake-by-wire systems because this allows the use of the lower force, solenoids rather than the large force, complex, rotary motors and gear trains now used to provide a mechanical advantage in order to develop the high forces currently needed for the conventional caliper disc brake system.

The illustrated twin brake system shown in FIG. 1G will now be described in detail and it comprises at least one pair of brake discs 38, 40 which are mounted on a hub 14 of a suspension for a vehicle with the braking disc being constrained i.e., positioned on the hub 14, along its inner radial portion by a resilient radially directed force applicator 44 acting between the hub 14 and the brake disc and by an outer force applicator assembly 45 which is positioned at the outer rim of the disc. This construction provides a rotational geometry for the disc to have contact between the disc and the brake pads in a random nature, thereby resulting in a lower residual, off-brake torque and reduction of DTV. That is, a gentle random touching of the brake pads and brake disc may occur when driving straight ahead with the pads and disc being held in non-tilting positions relative to one another. The inner, radially directed, force applicator is positioned between the slidable disc, and the hub to provide friction forces to the hub and to the disc which holds them against sliding relative to one another and against generating a noise or a high squeal when the brake disc is heated and expanded. That is, when the brake disc was cold, no squeal or noise was generated at the spline interconnection. But, when the disc was heated and expanded, disc spline members or teeth 42 (FIG. 5) were loose and slid in hub splines 20 and generated high pitched squealing noises.

Figure 4:
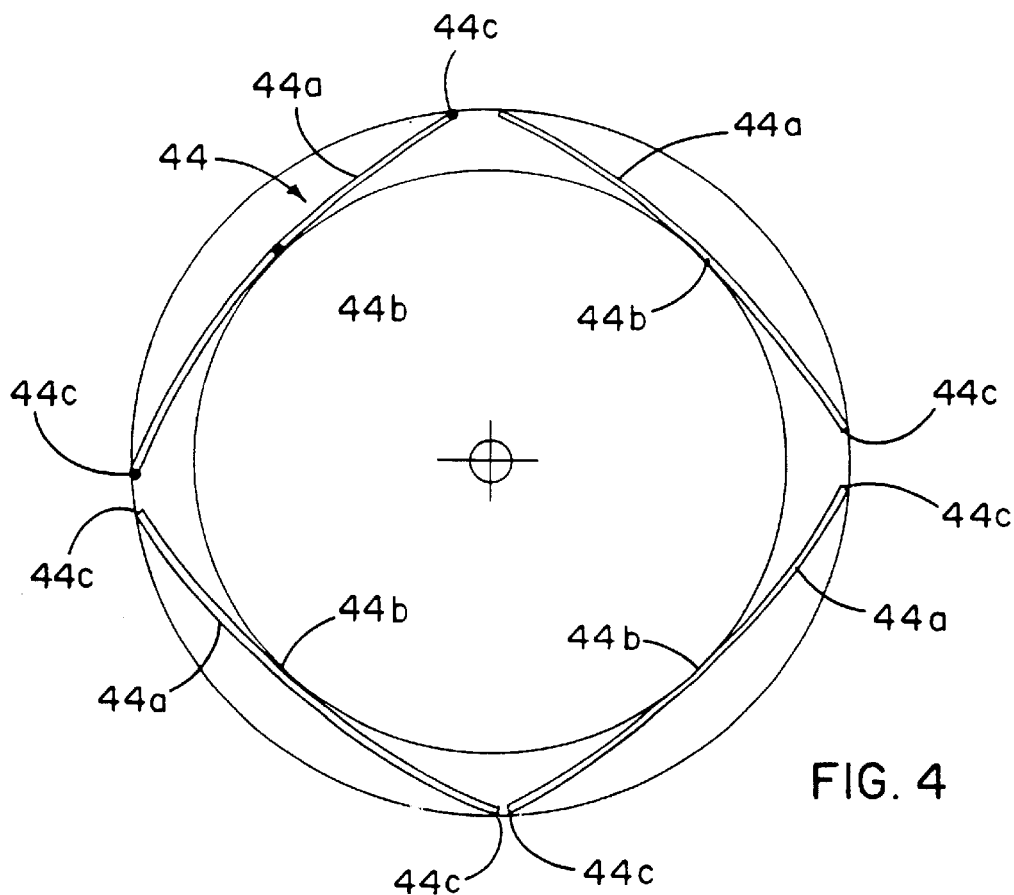
FIG. 4 is a diagrammatic view of three leaf spring constraining a brake disc on a hub.
Figure 13:
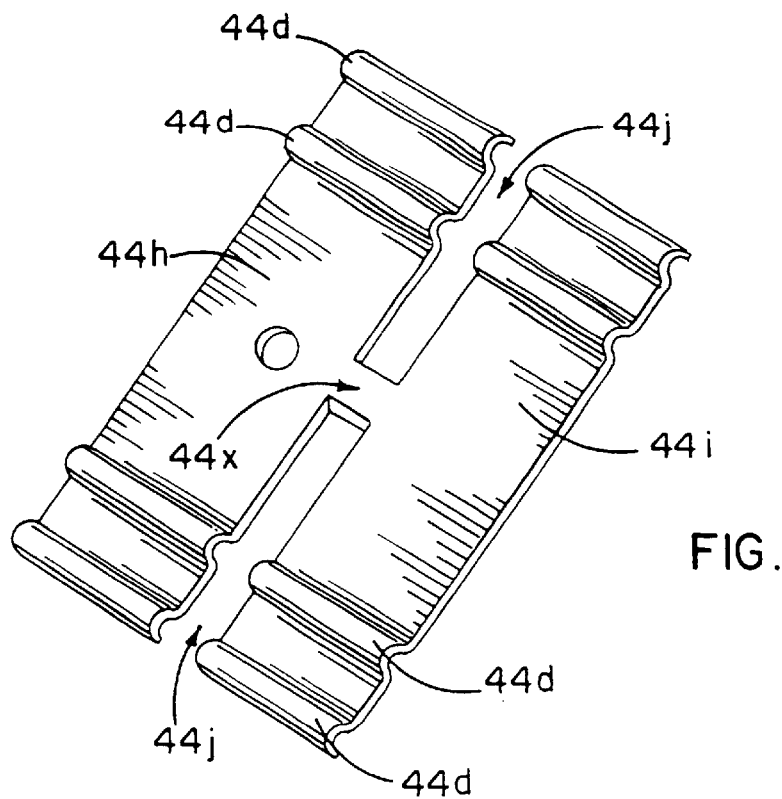
FIG. 13 is a perspective view of an alternative leaf spring having raised ribs thereon.
Figure 14:
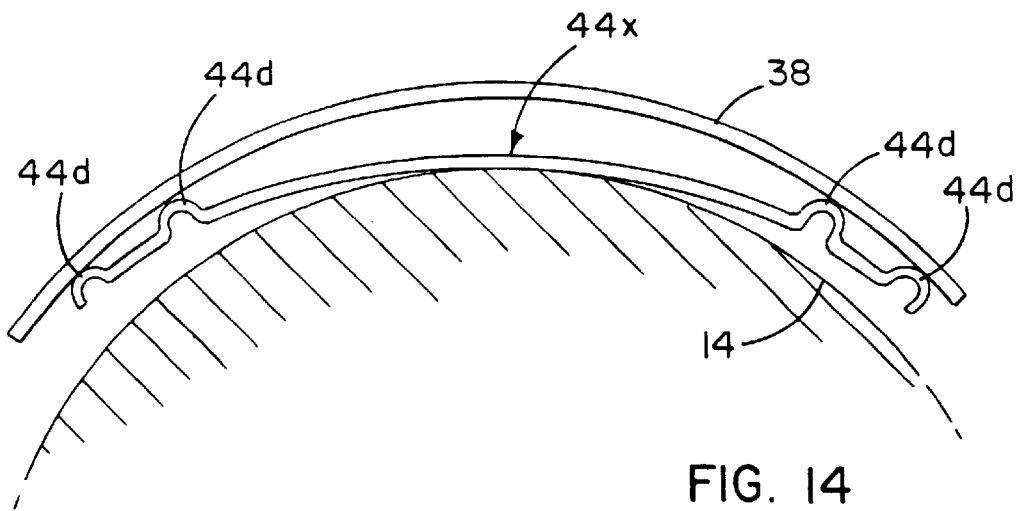
FIG. 14 is a diagrammatic, enlarged view of the points of contact between the leaf springs and the brake disc.

The preferred radial, inner force applicator 44 comprises springs, preferably flat leaf springs 44a, that are laid tangentially of the hub at their centers 44b (FIGS. 4 and 5) and with their outer ends 44c biased into contact with inner hub surfaces at spaced points, as illustrated in exaggerated form in FIG. 4. More spaced points of contact can be provided by providing raised ribs 44d on the leaf springs 44x, as illustrated in FIGS. 13 and 14.

The slidable brake disc 38 is thus supported in a floating manner on points of contact 44c (FIG. 4) with the leaf springs 44a on the hub in a floating manner and the brake disc can be shifted axially with forces applied thereto to overcome the frictional forces being applied by the springs at inner disc hub surface. When the brake disc expands considerably due to a disc high temperature, the disc teeth become loose in the colder spline hubs and the frictional forces between the leaf springs 44a and the brake disc and hub restrain the disc from shifting relative to the hub and a resultant squealing noise. The leaf springs 44a impart radially directed forces to the inner hub portion of the brake disc to keep it generally in a plane normal to its rotational axis through the center of the hub. This inner radial positioning by the springs 44a assists in keeping the disc 38 concentric with the rotational axis and within a relatively tight space envelope at the brakes off condition thereby reducing rubbing contact between the brake pad's frictional surfaces and the brake discs 38, 40 and a resultant disc thickness variation (DTV). DTV which is a major source of vibration.

Figure 3A:
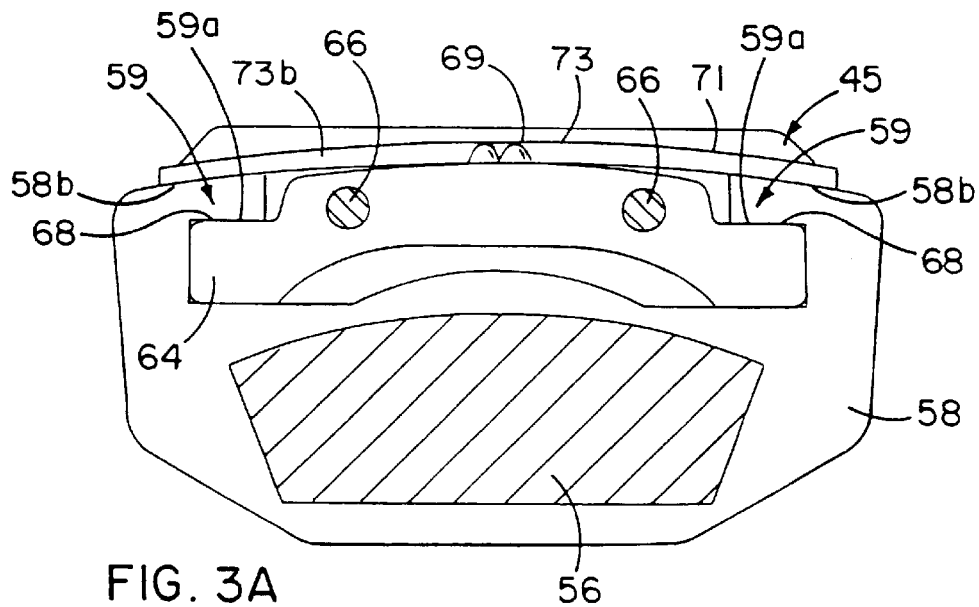
FIG. 3A is a cross-sectional view showing the spring applying restraining forces to the tops of the brake pad carriers.

In accordance with an important aspect of the invention, slidable brake discs 38 and 40 float on the hub 14 and its outer rim portion is constrained to its off-brake position, and each disc seeks or floats to an off-brake position established by engagement with slidable brake pads 50, 54 and 56, which slide on the guide surfaces 68 of the bridge-shaped guide member 64. As best seen in FIGS. 2, 3 and 3A, a brake pad, force applicator 71 is positioned to apply radially directed loads to the slidable brake pads to constrain them from sliding with predetermined spring forces. The spring forces are much stronger than that needed merely to prevent rattling or noise suppression. The spring forces are sufficient to restrain the slidable brake pads from moving into contact with the brake discs in an uncontrolled manner. It has been found that if only a light spring force is supplied to suppress noise, that the noise will be abated; but that the brake pads are free to shift and rub against the brake discs causing wear and DTV. Also, when using very light springs, the brake pads will not assist in positioning the outer rims of the slidable brake discs to reduce off-brake residual torque. The illustrated force applicator 71 comprises a pair of leaf springs 71a and 71b (FIGS. 2 and 5) which form the dual functions of preventing rattle and positioning of the pads and discs relative to each other.

After the brake has been applied and released, the rotating brake disc 38 initially rubs against the brake pads and forces from this rubbing cause the disc pads 50 and 56 to slide in opposite directions from the rotating disc. The amount of shifting is controlled by the brake force applicator's frictional force being overcome. Conversely, the off-brake, residual torque position of the rotating brake disc 38 is being constrained by the forced-apart brake pads, which are being held against further sliding by the force applicators. The force applicator springs 44 also are controlling any lateral sliding of the brake disc 38 along the hub. The brake disc 38 is being constrained in its off-load position by the outer force applicators acting on opposite sides of the pair of discs and the inner springs 44 acting on the inner hub portion of the discs. Thus, the disc is controlled to be free to slide and float but not to topple into the brake pads and the brake pads have controlled sliding but are not free to topple or to be free to vibrate into or bang against the discs.

Figure 8:
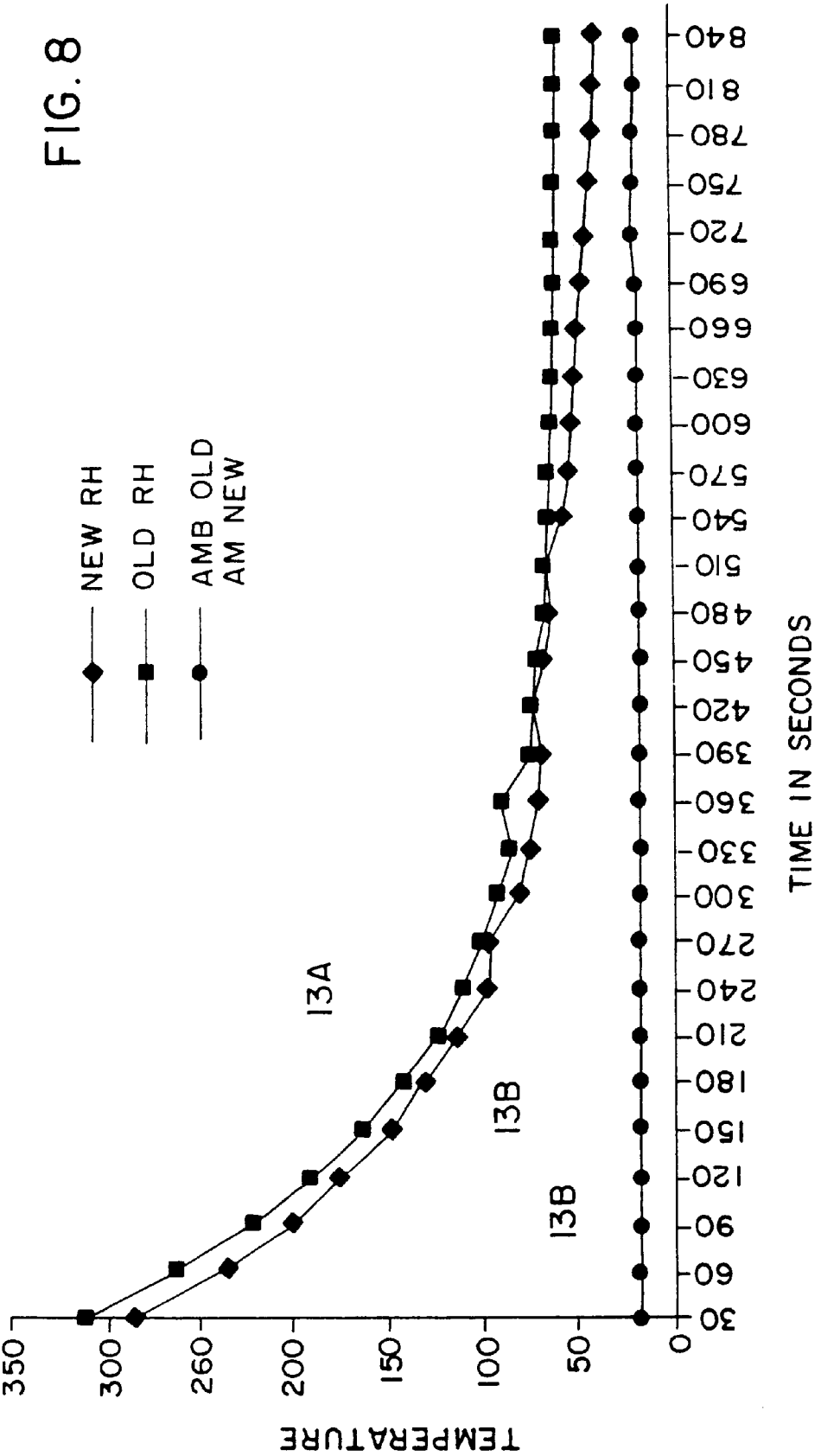
FIG. 8 shows temperature decay curves for disc brakes due to residual drag torque with the brakes off.

The ABS twin disc brake assembly 10 of the present invention, because of its floating geometry as described above, has a significantly lower drag torque, i.e., off-brake residual torque, as will be explained in connection with FIG. 8 which illustrates a typical result for the disc temperature curves from 100 Kph. for the ABS twin disc brake versus a conventional, ABS disc brake. The conventional fixed brake curves 13A plateaus at best is 350° C. above ambient while the ABS twin disc brake 10 continues to cool and stabilizes at 10° above ambient, as illustrated by the straight line 13B. Usually, the conventional brake was found to be about 50°–70° C. above ambient. The assumption made with respect to this test is that dynamic drag due to disc face contact with the pad is proportional to temperature at the disc. The present invention is designed to preferably produce a low residual torque, e.g., about 1 newton meter or less in contrast to about 6 newton meter for the fixed disc brake on the vehicle being tested herein.

As explained above, the vehicle wheel being used in this ABS twin brake system can accelerate faster toward the vehicle speed because of lower residual torque drag than can the conventional ABS wheels having the high torque drag from the conventional disc brake.

In accordance with the invention, the brake discs 38 and 40 must be flat and planar in their rotational plane and substantially normal to the rotational axis 9 (FIG. 2). The brake disc pads have outer planar surfaces 50*a*, 54*a*; 56*a* and 60*a* which are held by the springs 71*a* and 71*b* to be parallel to the disc annular braking surfaces 38*a* and 40*a* at the outer rim portion of the brake discs 38 and 40. When the disc geometry is slightly curved, i.e., not a flat planar surface, it has been found that localized rubbing and wear occurred, as illustrated in FIG. 2, at a lower corner 50*b* of the cylinder brake pads 50 and at the upper outer corner 54*b* of the opposed brake pad 54 on the slidable pad carrier 58. FIG. 2 shows a very exaggerated tilted disc 38 in lines to illustrate the point being made. The non-flat brake disc did not have random contact with the brake discs 38 and 40; but had localized rubbing contact due to the disc curvature at the inner and outer corners 50*b* and 54*b* during each or almost each revolution of the brake disc. Severe disc thickness variations resulted and vibrations of the brake occurred. When the non-flat discs were replaced with flat brake discs the random engagement of the pads and discs was again achieved, the DTV and vibrations associated with the DTV were eliminated. If a localized spot carries the load, you get wear and a pumping action at wheel frequency.

While not illustrated herein, it was found that if the slidable brake pad surfaces 50*a*, 54*a*, and 56*a* (FIG. 2) were not held in parallel relationship to the brake disc faces 38*a* and 40*a*, but were freely mounted or loosely mounted on the bridge, that the brake pads could tilt or cock and cause DTV and resultant vibration, as described above for a non-flat brake disc. Stated differently, the springs 71*a* and 71*b* were strong enough to hold the brake pads against a tilting that would shift their planar pad surfaces 50*a*, 54*a* and 56*a* from planes perpendicular to the rotational axis 9 and would bring a corner thereof into continual, localized rubbing contact with a brake disc in the off-brake position. Thus, the floating geometry for the brake discs and constraint of the brake pads and discs to achieve random contact at the off-brake position is an important aspect of the invention.

Figure 9:
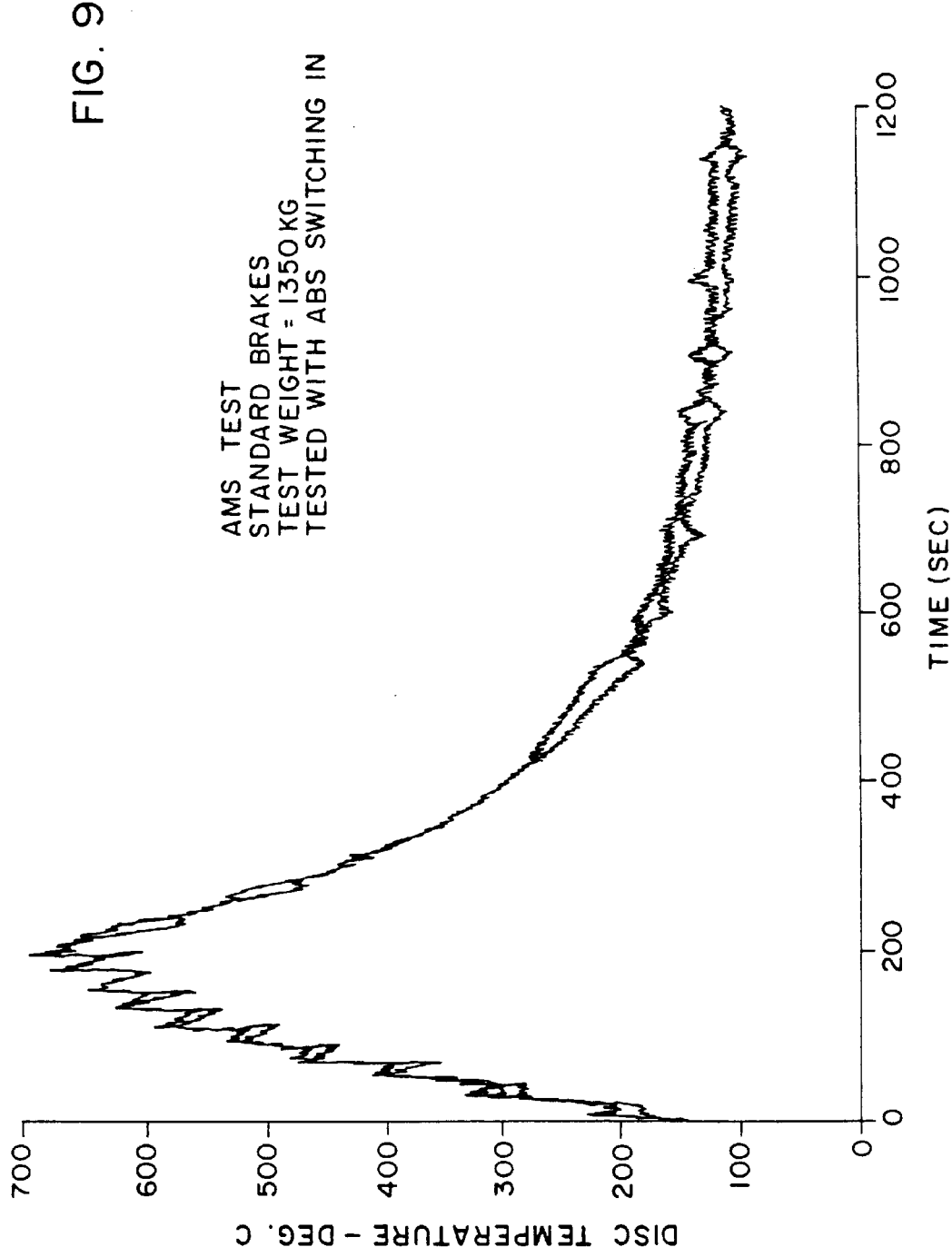
FIG. 9 shows curves for an AMS fade test of a standard fixed brake.
Figure 10:
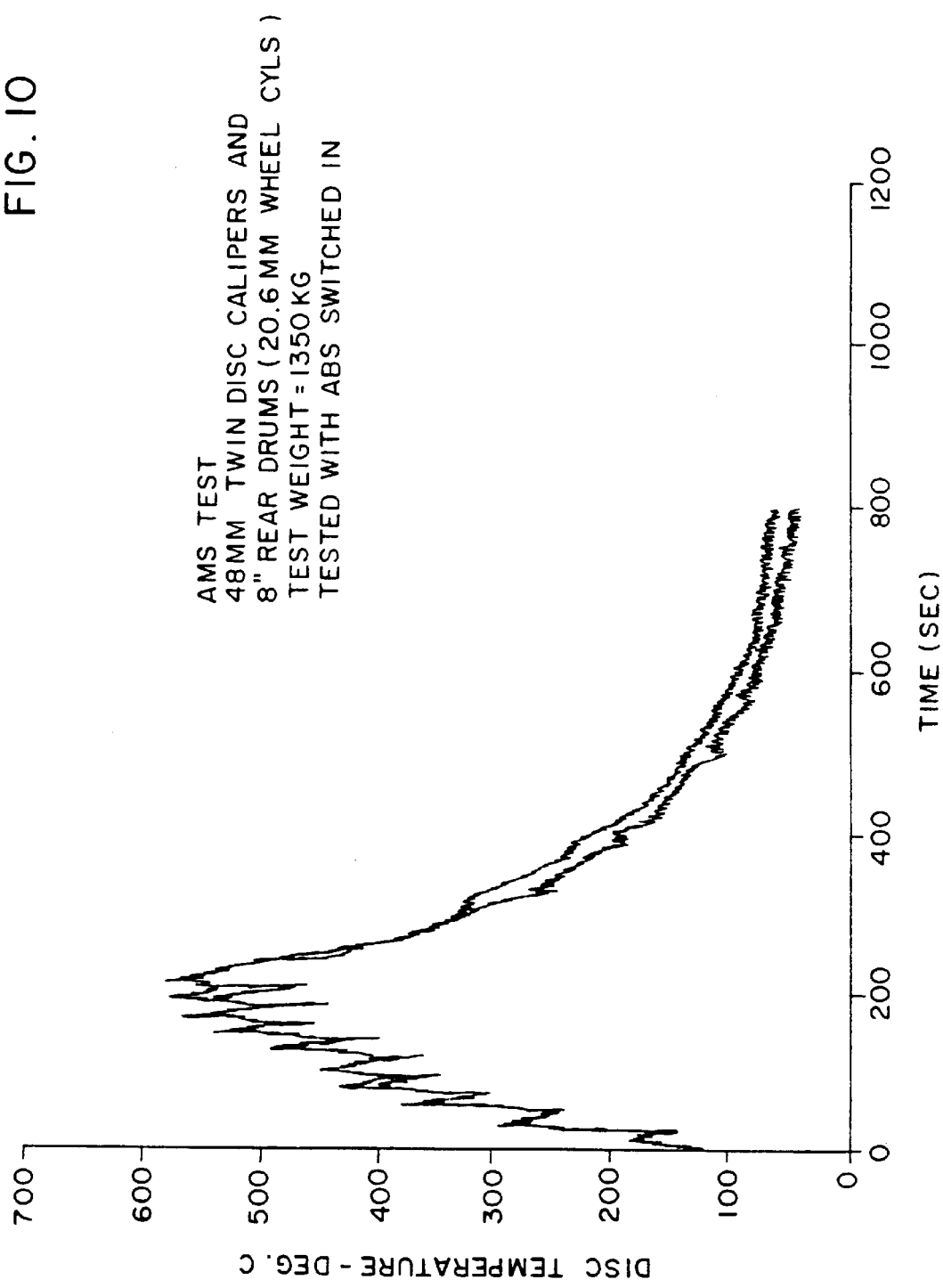
FIG. 10 shows the curves for an AMS fade test of a twin disc brake.

AMS fade tests were run to compare the performance of the ABS twin disc brake assembly 10 of this invention versus the standard factory equipped fixed brake disc, and the results are shown in FIGS. 9 and 10. As seen in FIG. 9, there are ten peaks on the graph for each of the ten braking stops with the brakes cooling and showing a temperature drop of about 30° C. and a maximum disc temperature of about 700° C. which is the Judder range. In contrast, the ABS twin slidable brake disc system had a maximum temperature of 580° C. (FIG. 10) or about 120° C. lower than the conventional disc brake. The temperature drop between braking events was about 80° compared to only a 30° C. temperature drop for conventional disc brake. Thus, the present ABS system passed the AMS fade test where the conventional ABS brake system being tested did not pass the AMS test.

In accordance with the present invention, the preferred drive connection 19 has the brake disc teeth 42 sized to fit the grooves 20 along both of the groove flanks 21 without using oversized grooves. This is in contrast to the prior art which used oversized spline grooves and small springs therein to engage the driving side flanks of the hub and disc; but this prior art solution led to other problems like disc wobble on the hub. Preferably, the driving connection of the present invention is a very efficient one such as that akin to a pair of meshed gears where the contact is a line of contact across the engaged flanks 21 (FIG. 15A) rather than a small point of contact to provide lower unit pressures. Preferably, this line of contact is maintained whether the brake disc has a high or low temperature. The plastic deformation at the engaged spline surfaces keeps the engaged spline members clean from corrosion. The present invention eliminates the brinneling, dust generation, and squirming of the disc at high braking torque.

Figure 7:
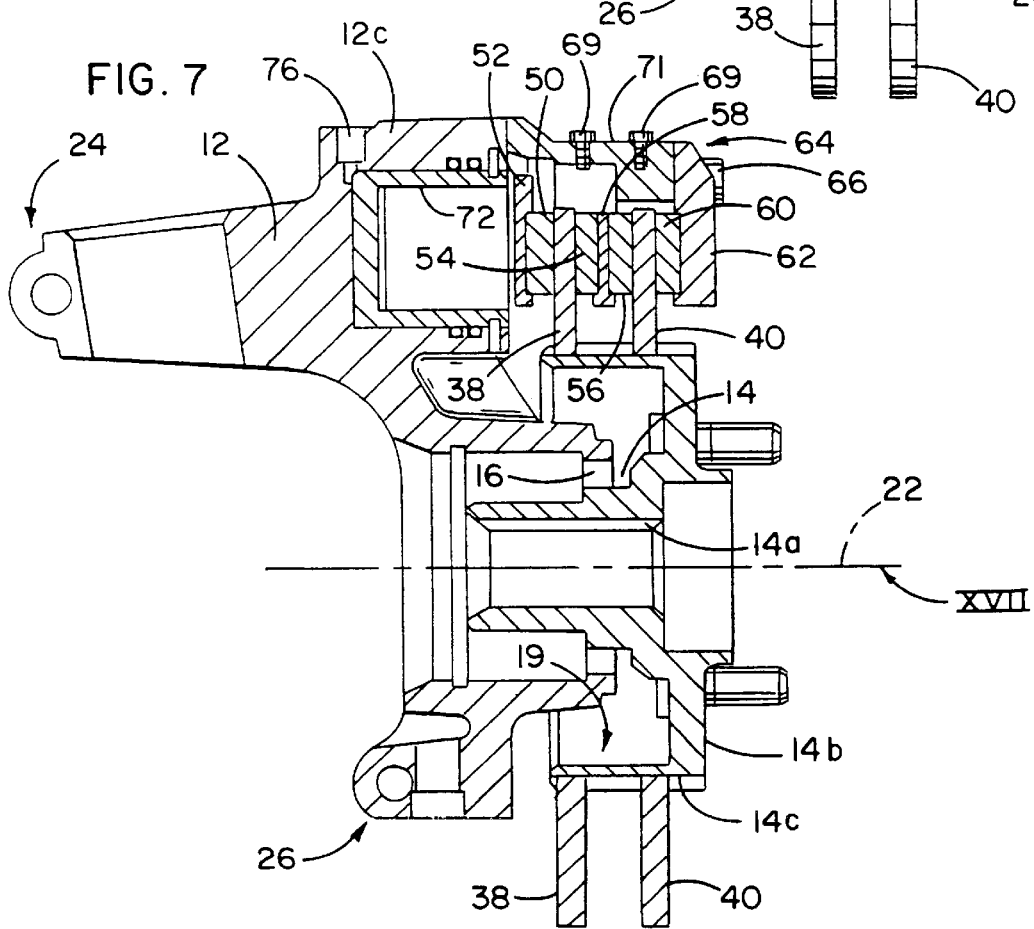
FIG. 7 is similar to FIG. 6 but shows the illustrative assembly in vertical cross section.

The hub 14 is an integral casting and, as is conventional, has a hollow cylindrical rearward projection 14*a* which has a splined interior, and an exterior, which provides a mounting for roller bearings 16 (FIG. 7). A splined projection of a constant velocity joint (not shown) at the end of a drive shaft is received within the projection so that the hub can be rotated on the bearings 16 by the drive shaft. The hub also has an annular disc-like portion 14*b* from which the portion projects rearwardly. The hub provides a mounting for the wheel (not shown) which is bolted against a forward surface of the portion by bolts received in holes 14*d*. The hub also has a hollow cylindrical rearward projection 14*c* of greater diameter than the portion. The portion projects from the outer edge of the portion 14*b*. The portion 14*c* has an outer surface provided with grooves 20 running parallel to the axis 22 about which the hub rotates. The grooves 20 are arranged in four equally circumferentially-spaced locations.

Figure 11:
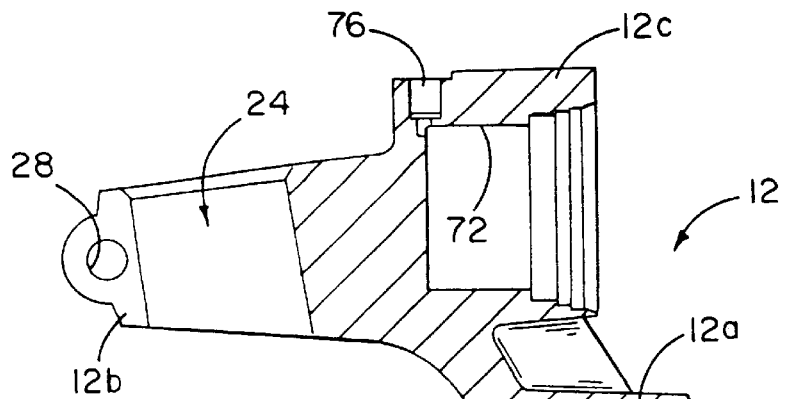
FIG. 11 is a vertical cross-sectional view taken through a suspension link of the illustrative assembly.
Figure 12:
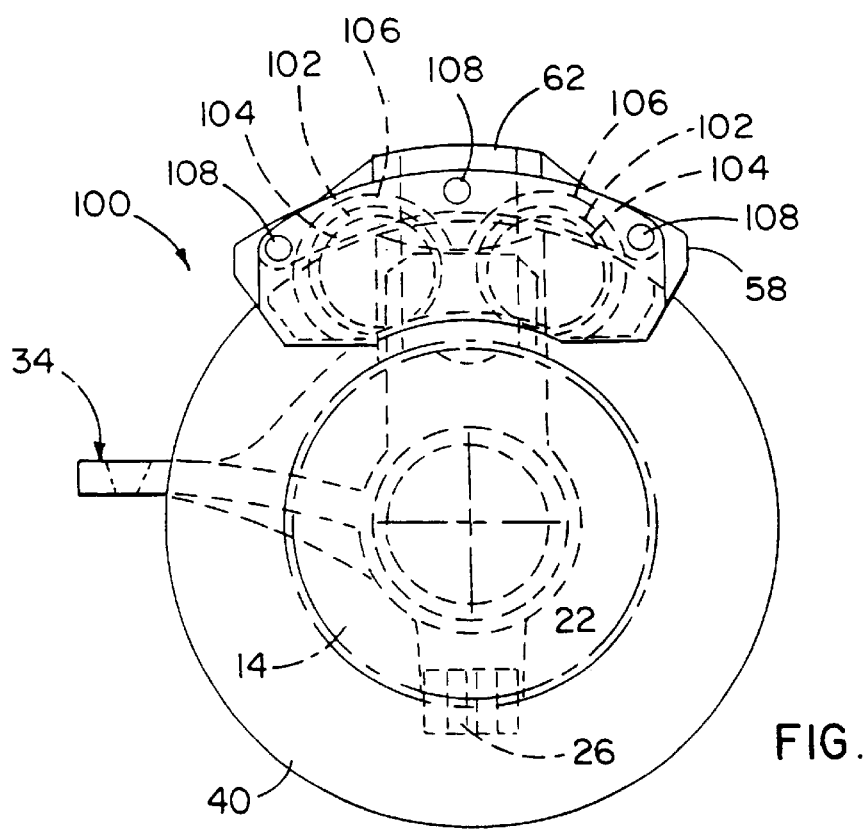
FIG. 12 is a view similar to FIG. 16, but of a modification of the illustrative assembly.

The suspension link 12 (FIG. 11) is an integral casting and comprises a hollow cylindrical portion 12*a* of conventional form, which provides a mounting for the bearings 16 so that the hub 14 rotates on the link. The link also comprises top 24 and bottom 26 mountings for supports of the link. The top mounting is provided by a portion 12*b* of the link which projects rearwardly from a portion 12*c* which projects upwardly from the portion 12*a*. The portion 12*b* is of conventional form and forms two semi-cylindrical arms (FIG. 5) which together form a clamp which can be tightened by a bolt (not shown) which extends through bores 28 in the arms and across a gap between them. A McPherson strut (not shown) can be clamped between the arms of the portion 12*b* so that the link can pivot about the longitudinal axis of the strut.

The bottom mounting 26 is provided by a portion 12*d* of the link 12, which projects downwardly from the portion 12*a* thereof. This portion 12d is of conventional form and has a vertical bore 30, to receive a pin of a ball joint (not shown), and two horizontal bores 32 in which bolts (not shown) can be received to connect the link to a tie bar (not shown).

The link 12 also comprises an arm 34 for connection to a track rod (not shown) of a steering system of the vehicle. This arm 34 is of conventional form and is provided by a portion 12e of the link 12, which projects sideways from the portion 12a thereof. The arm 34 comprises a vertical bore 36 through which the arm can be pivotally connected to the track rod. In order to steer the vehicle, the track rod is moved to cause the link to pivot on the joint 18 and the mountings 24 and 26.

Figure 5:
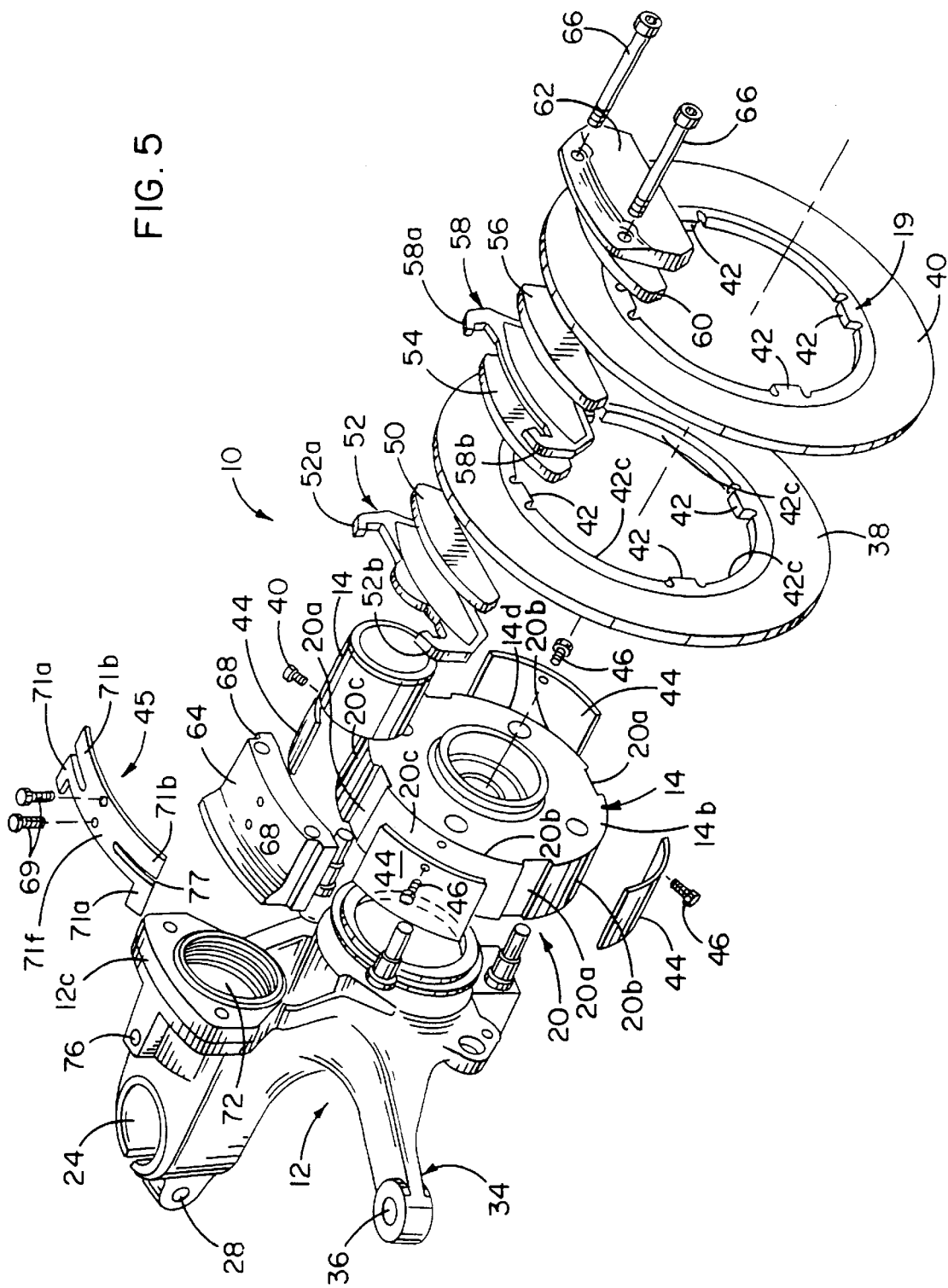
FIG. 5 is an exploded view of the illustrative assembly.
Figure 6:
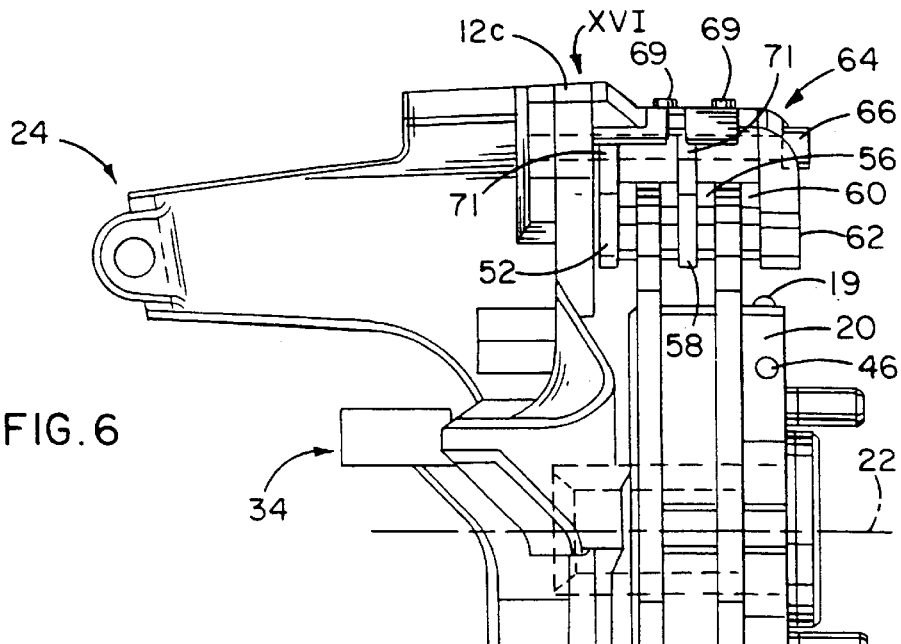
FIG. 6 is a side elevational view of the illustrative assembly.
Figure 15:
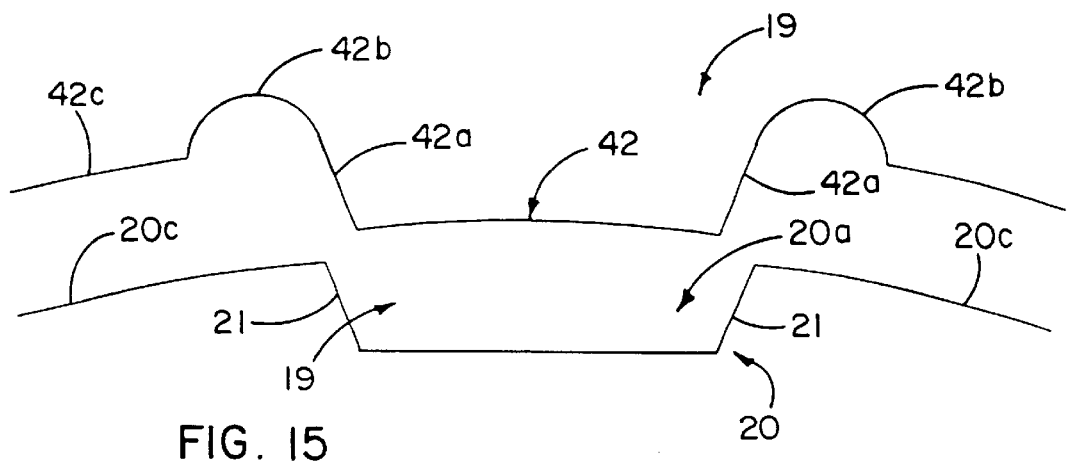
FIG. 15 is an enlarged, fragmentary and exploded view of the driving connection between a hub and slidable brake disc.
Figure 15A:
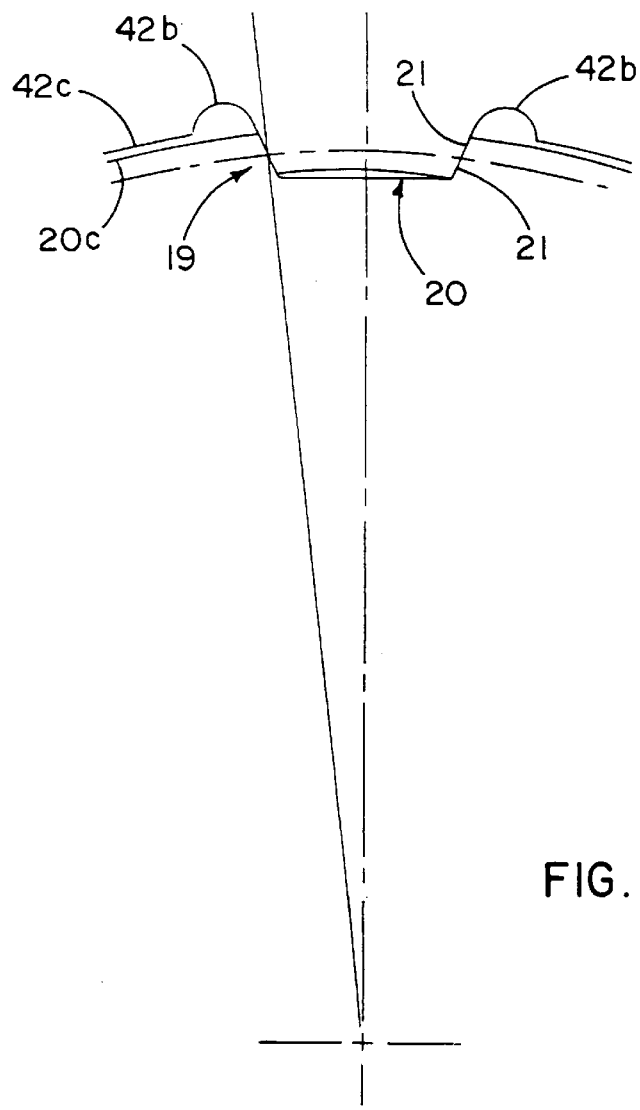
FIG. 15A is similar to FIG. 15 except that the driving connection is enlarged and meshed to drive the brake disc with rotation of the hub.
Figure 16:
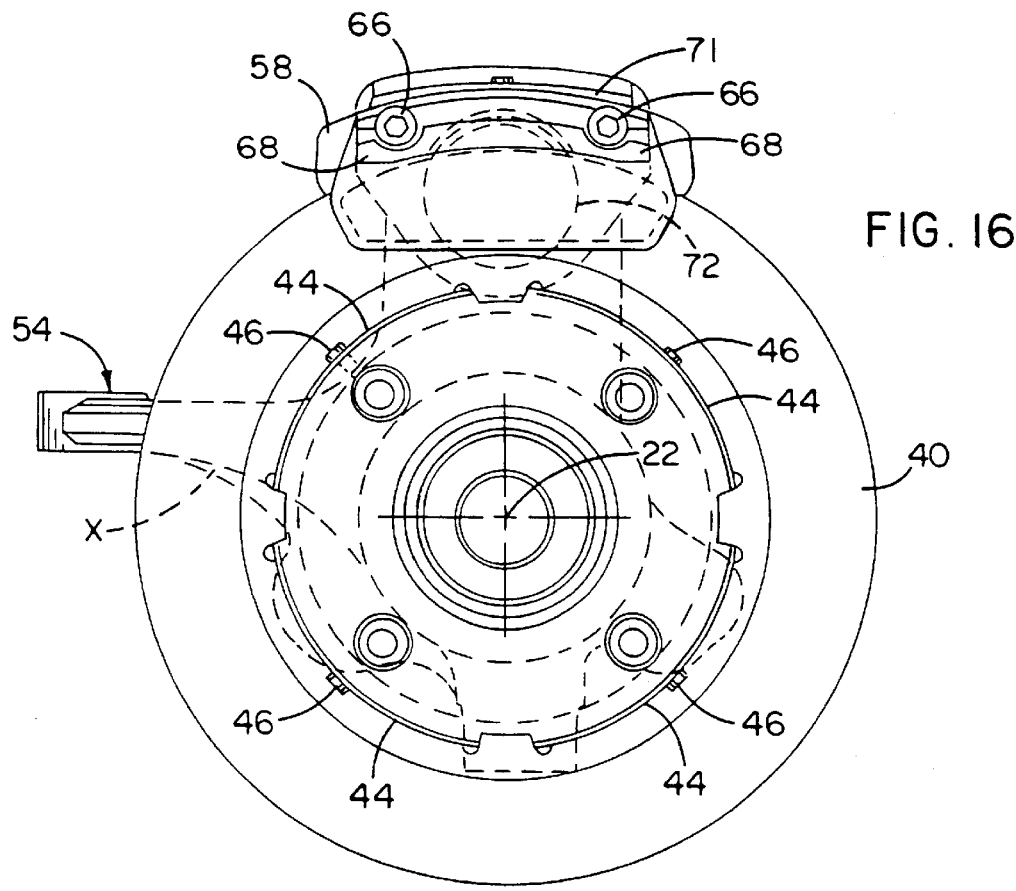
FIG. 16 is a view taken in the direction of the arrow XVI in FIG. 6.
Figure 17:
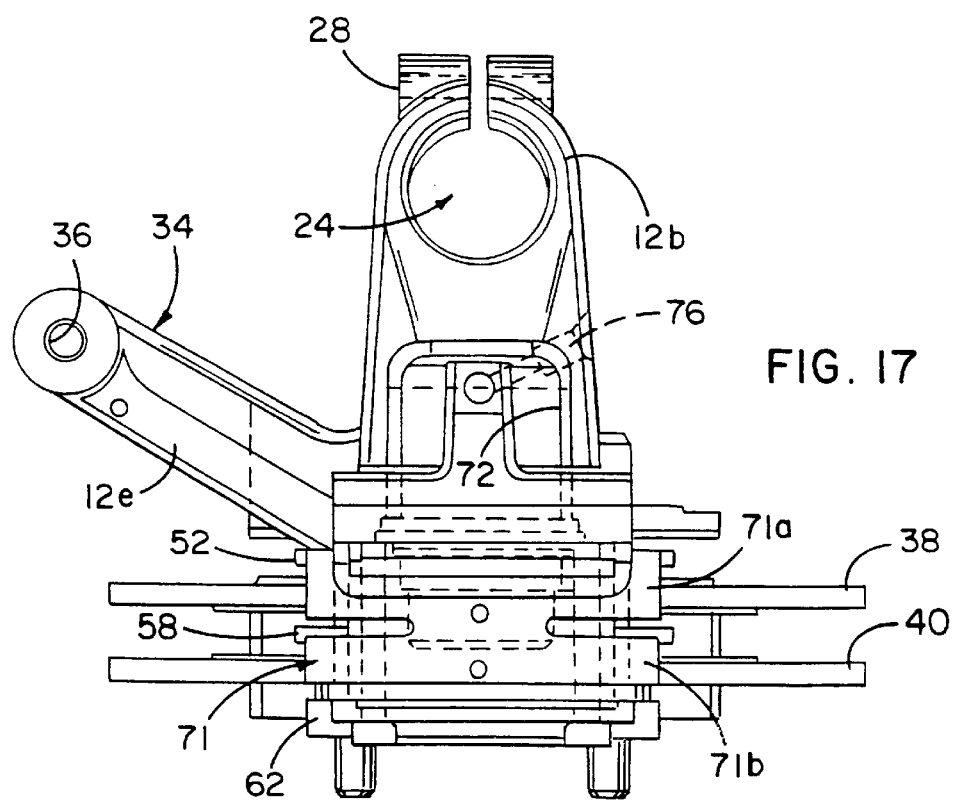
FIG. 17 is a view taken in the direction of the arrow XVII in FIG. 7.

The twin discs 38 and 40 are identical to one another and are mounted for limited movement on the hub 14 in a direction generally parallel to the axis 22 about which the hub rotates. Specifically, each disc is in the form of a flat annular plate and has inwardly-projecting teeth 42. As best seen in FIGS. 5, 15 and 15A, it is preferred that the brake discs 38 and 40 each have a limited number of wide teeth, i.e., the illustrated four teeth 42 that mesh with the spline grooves 20a of splines 20 on the hub. The spline grooves 20a are four in number, in this instance, and have flanking walls 21 (FIG. 15) that match flanking walls 42a on brake disc teeth 42. The engaged flanks 21 and 42a have an angle A for their respective tooth flange angles. Manifestly, the number of teeth and splines may be varied. Because of large stresses generated on the thin teeth 42 on these relatively thin brake discs, there is a tendency of stress cracks to form, particularly after high temperature heating and cooling cycles and high stress cycles. To relieve such stress, there are provided large, curved, stress relief fillets or cut-outs 42b in the respective brake discs. Herein, as shown in FIGS. 15 and 15A, the stress relieving fillets are provided on each side of a tooth 42 and provide generally semi-cylindrical, cross-sectional openings on each side of each tooth, when the teeth are fitted into a spline grooves, as shown in FIG. 15A.

As best seen in FIG. 5, the four grooves 20 on the hub are relatively small compared to the projecting teeth 20b defined between each pair of adjacent grooves 20. These teeth 20b on the hub have large, arcuate surfaces 20c against which are laid the leaf springs 44. Thus, each leaf spring 44 has a large circumferential area contact with inner, arcuate surfaces 42c of the brake disc in the place between depending teeth 42 thereon.

Four leaf springs 44 are mounted on the hub 14 to provide resilient force applying means to apply radial forces between the hub and the discs 38 and 40. These radial forces prevent the discs from tilting on the hub, prevent rattling and control sliding of the discs along the hub. The resilience of the springs allows thermal expansion to be accommodated, as explained above. The springs are secured in a suitable manner, such as by screws 46 to the outer surface 20c of the hub portion 14c in the gaps between the spline grooves 20a. Each of the four springs engages both of the discs 38 and 40 in the areas between the teeth 42, giving a resilient four-point mounting for each disc. The discs can slide on the hub parallel to the axis 22 with the teeth sliding in the spline grooves 20a.

As best seen in FIG. 4, the flat leaf spring 44 is engaged with and has a pressure line of contact with the hub at point 44b; and the outer ends of the spring 44c have been flexed downwardly to provide pressure line of contact engagement with the discs 38 and 40 at these bent spring ends. In order to provide more lines of engagement between the disc and the hub, the spring 44x may be provided with ribs 44d therein, as shown in FIGS. 13 and 14. Also, it is preferred to separate the spring 44 into separate biasing portions 44h and 44i (FIG. 13) separated by a slot 44j each portion acting on an associated disc 38 or 40 to provide more individualized, independent pressure forces between the associated disc and the hub. The springs 44 are balanced in the force they apply to the brake discs 38 and 40 relative to the force which the springs 71a and 71b apply to the slidable brake pad carriers 52 and 58. Both the brake discs and the brake carriers are constrained against shifting along the hub and the bridge respectively, due to vibrations and inertial forces from the vehicle when it is traveling. Thus, it will be seen that the springs 44 allow the slidable brake discs to: float on the hub, hold the discs in a radial plane normal to the rotational axis, apply frictional forces that prevent squealing; apply frictional forces that aid in holding the discs in position while rotating in their off-brake positions; and permit axial forces from the force actuator to outwardly slide the discs to their braking position with engagement of the disc 40 with the stationary brake pad 60.

Turning now in greater detail to the illustrated brake pads, these pads comprise the first pad 50 which is mounted on a backing plate 52 and is arranged to engage a side surface of the disc 38, pads 54 and 56, which are mounted on opposite sides of a backing plate 58 and are arranged, respectively, to engage the opposite side surface of the disc 38 and a facing side surface of the disc 40, and the pad 60 which is mounted on a backing plate 62 and is arranged to engage the opposite side surface of the disc 40. The backing plate is fixedly mounted on a guide member or bridge 64, which is, in turn, fixedly mounted on the portion 12c of the link 12. Specifically, two bolts 66 pass through bores through the portion 12c and the guide member 64, and have threaded ends which are received in threaded bores in the backing plate. The stationary guide member 64 provides two guidance surfaces 68 on which the backing plates 52 and 58 slide. The guidance surfaces 68 extend, parallel to the axis 22, along opposite sides of the member 64. The guidance surfaces may take other forms such as the shafts of the bolts 66.

Each guidance surface 68 receives a pair of concave, U-shaped projection or hooks of the pad carriers 52 and 58. As best seen in FIG. 3A, the slidable pad carrier 58 has hook-shaped projections 59 with inner sliding surfaces 59a, which are slidably supported on the upwardly-facing support surfaces 68 of the bridge 64. To assist in achieving the desired balance to allow the brake pad carriers 52 and 58 to be pushed apart from and by the brake discs 38 and 40, when they are shifting axially from their brakes-on to their brakes-off positions; and yet constrain the pad carriers and their brake pads from tilting, it is preferred to machine flat the inner sliding surfaces 59a on the carriers and the supporting surfaces 68 on the bridge. Flat machined surfaces on the carriers engaging flat machine surfaces on the bridge assures a more uniform, frictional, constraining force to retain the brake pad carriers against axial sliding from their off-brake positions. Also, the carriers will have broader, wider engagement with bridge supporting surfaces 68 to assist in preventing significant rocking or tilting on the bridge under vehicle inertial forces and/or vibrations when the vehicle is moving, as would cause localized rubbing contact in the off-brake condition.

If the slidable brake pad position is not controlled, the slidable brake pad may tilt to engage or to vibrate against the slidable brake disc and generate a random wear pattern on the disc causing DTV and vibration of the disc. The control of the slidable pad and disc is important in a very dynamic situation with the vehicle wheel carrying the slidable brake system over bumpy or smooth roads, cornering with brakes on, cornering with brakes off, with ABS system on, with an ABS system off, etc. On cornering, the hub deflects and moves the disc surface to engage the brake pad; and after cornering, the pad and disc separate as the brake recovers to its steady state of low residual torque at the off-brake position. In the embodiment of the invention, illustrated in FIGS. 2, 3 and 3A, the preferred force applicators comprise flat leaf springs 71a and 71b that have been bent from their flat planar condition to a bow configuration in which outer edges 71c and 71d of the springs abut top end surfaces 52a, 52b, 58a, 58b of the respective slidable brake carriers 52 and 58. The center portion of the leaf spring 71a is secured by a suitable fastener, such as screws 69 threaded through the spring and into the stationary bridge 64 at a central location on the top of the stationary bridge 64.

The force applicator 71 may take many forms, and it is herein illustrated in FIG. 3 as having the two separate leaf spring portions 71a and 71b, each of which is separately applied resilient, biasing forces to its associated brake pad holder 52 or 58. The leaf spring portions 71a and 71b are preferably connected by a short integral, central web 71f, which is located between a pair of facing, elongated slots 77 dividing the spring leaf into the two discrete spring force applicator sections. Thus, if one brake pad holder has high points thereon or other force mitigating or amplifying factors affecting it and its associated spring; the other brake pad holder and its associated spring should be isolated therefrom.

As previously explained in the embodiment of FIGS. 1–17, the brake actuating force used to brake the vehicle is from a brake actuator which is in the form of a hydraulic piston and cylinder assembly 75. In the embodiment of the invention described in connection with FIG. 18, as an alternative to the use of an electric motor and a gear drive used in the prior art, brake-by-wire ABS systems, the solenoid 110 (FIG. 1F) or pair of solenoids 110 and 112 (FIG. 18) may shift the movable brake pad carriers 52 and 58 to carry the slidable brake pads into their respective braking positions and slide the brake discs axially along the hub 14 into their respective braking positions.

The illustrative force actuator system comprises a piston and cylinder assembly operable to urge the pads 50, 54, 56 and 60 into engagement with opposite side surfaces of the discs 38 and 40 to brake the hub 14 and hence, the wheel. The piston and cylinder assembly comprises a cylinder 72 which is defined by the portion 12c of the link 12. Thus, the cylinder is formed integrally with the remainder of the link. A brake-by-wire actuator such as the solenoid 110 shown in FIG. 1F or an electric motor (not shown) may be mounted in the hollow cylinder bore 72 rather than the piston 74. Herein, the piston 74 of the assembly projects from the cylinder and engages the backing plate 52 on the opposite side thereof to the pad 50. The piston and cylinder assembly is operated by supplying hydraulic fluid under pressure to a bore 76 in the link portion 12c which communicates with the cylinder. Herein, the hydraulic pressure for operating the twin disc brake system was about 30 to 35 BAR which is one-half of the 70 BAR pressure of the conventional fixed disc brake on the other test vehicle. The piston had a face of about 200 mm in area. The piston moves out of the cylinder moving the backing plates 52 and 58 and the discs 38 and 40 until the disc 40 engages the pad 60, which does not move.

The hydraulic piston and cylinder assembly 75 includes a seal which acts between the cylinder 72 and the piston 74 to prevent egress of hydraulic fluid from the cylinder. This seal is provided by an elastomeric sealing ring, which is mounted in an annular groove formed in a cylinder wall, the ring projecting from the groove to engage the piston. This sealing ring also serves as an energy storing mechanism. Specifically, when the assembly is operated to move the piston outwardly of the cylinder to put the brake "on", the ring is compressed thereby storing energy therein. When the pressure of the hydraulic fluid in the cylinder is reduced, the ring releases the stored energy therein by moving the piston inwardly of the cylinder (away from the brake disc). Accordingly, the sealing ring has to engage the piston with a significant force. Movement of the piston away from the disc allows the movable pads 50, 54 and 56 of the brake to be moved away from the disc by forces exerted thereon by the rotating slidable brake discs 38 and 40 overcoming the force of the spring 71a and 71b; thereby putting the brake into a "brakes-off" condition.

The return of the piston 74 by the seal reduces the off-brake torque because there is no significant force being applied by the piston to the brake carrier 52 and its brake shoe 50 relative to the facing side of the slidable brake disc 38. Conversely, the floating brake discs 38 and 40 are constrained and float on the hub 14 and will not shift the piston inwardly into the cylinder to displace hydraulic fluid, in the cylinder causing "knock-back" during cornering or other dynamic movements of the wheel assembly. The reduction of knock-back provides a better feel to applying the brakes with less fluid displacement, and eliminates the occasional long pedal displacement feel where substantial fall-back has occurred.

From the foregoing, it will be seen that the present invention provides a much smaller disc brake assembly without the very large caliper sliding and bolts as in the conventional, fixed disc brake. The caliper is large because it carries the cylinder and piston and the slidable bridge must withstand and transfer the large torque brake loads. The present invention is smaller because the cylinder can be integrated with the support and the bridge does not slide and carry the piston. Because of knock back and other problems, this large fixed brake is usually mounted at about 3:00 or 9:00 o'clock positions whereas in the present invention the brake is mounted at the top of the unit at the 12:00 o'clock position. The stiffness problem of the bridge with its deflection, e.g., 0.006 inch, is reduced by a factor of four when using four brake pads and one-half the hydraulic line pressure allowing a smaller and lighter weight brake assembly. The time of mounting and assembly of the brake, as well as repair or replacement, is enhanced because of the front bolting and the telescopic sliding of the brake discs and of the brake components versus the bolt from the rear or behind of the fixed brake bolts on which the caliper slides.

As explained above, the ABS twin brake system of this invention operates at about one-half of fluid pressure of the conventional ABS for the same vehicle. If it is desired to reduce the pressure again by about one-half, a pair of hydraulic cylinders 102 (FIG. 12) may be used rather than a single cylinder within the stub axle. Alternatively, a pair of solenoids 110 and/or 110, 112 (FIG. 18) could be housed in bores in the stub axle rather than a single solenoid to reduce the force needed and to supply redundancy of operation if one solenoid should fail. The brake cylinder of FIG. 16 and the pair of brake cylinders of FIG. 12 for the actuator system 100 of FIG. 12 have like parts which are given the same reference numerals and are not further described. The assembly 100 has two parallel cylinders 102 formed in portion 12c of the stub axle. In this case, each of the cylinders 102 has a smaller transverse cross-sectional area than the cylinder 72, but the total area of the cylinders 102 is greater. Each of the cylinders 102 has a piston 104 therein and the pistons 104 cooperate in pressing the backing plate 52. In order to accommodate the two piston and cylinder assemblies, the guide member 64 is modified to arch over the pistons, as shown at 106 and the bolts 66 are replaced by three bolts 108. The use of two piston and cylinder assemblies enables greater force to be applied for the same pressure in the cylinders (or the same force to be applied for lower pressure) and this force can, on average, be applied at a greater distance from the axis 22. If desired, the two cylinders can be of different diameters, e.g., with the leading cylinder in the normal direction of rotation, being of greater diameter.

In the illustrated embodiment of the invention described herein, the force actuator for the applying of the brake clamping pressure has been from the conventional vehicles hydraulic system having a common master cylinder and hydraulic lines or hoses extending from the master cylinder to four cylinders, such as the illustrated two, front wheel cylinders, the rear wheel cylinders for operating the rear drum brakes, have not been illustrated herein.

Figure 1E:
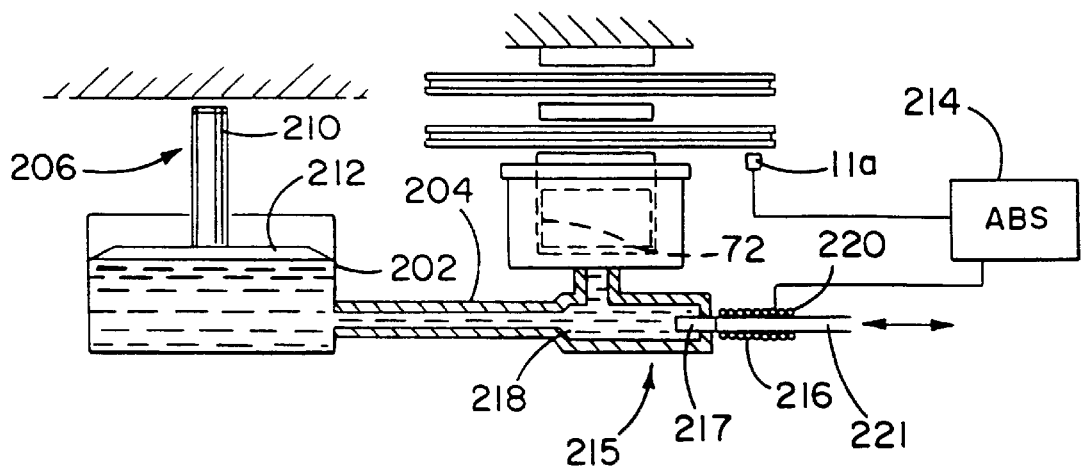
FIG. 1E illustrates a reservoir of hydraulic fluid mounted and hydraulic control valve mounted on a vehicle wheel suspension and operable in accordance with the invention.
Figure 1F:
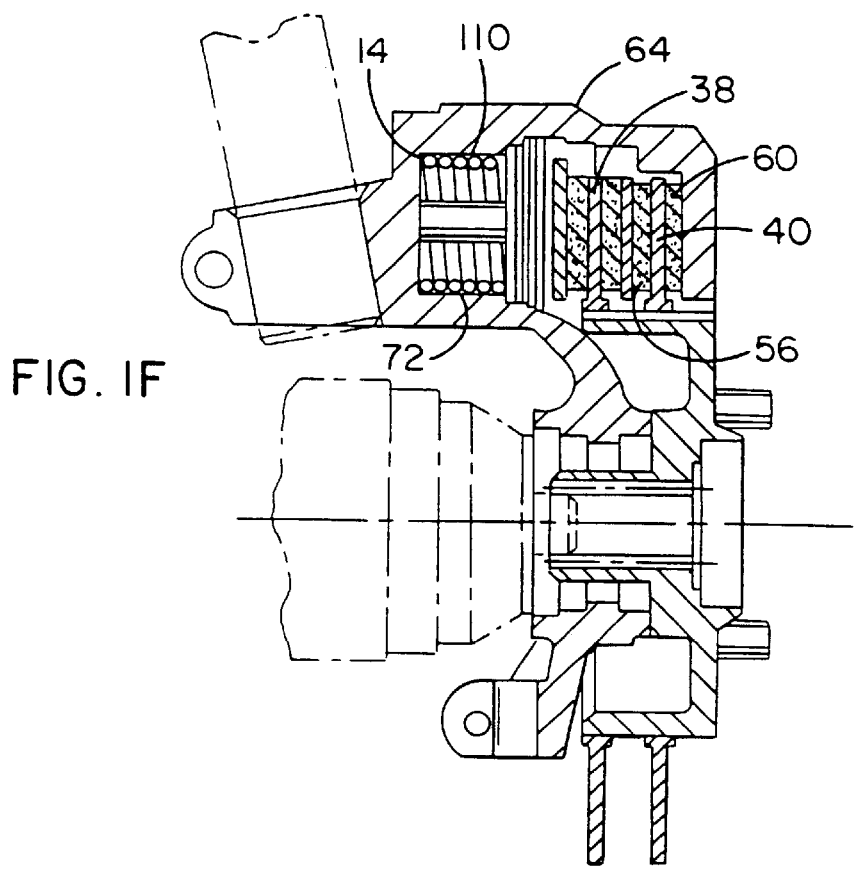
FIG. 1F illustrates a solenoid force actuator mounted in a hollow bore of a stub axle of the suspension.

In accordance with a further embodiment of the invention illustrated in FIG. 1E, a master cylinder 13a (FIG. 1A) and its lines 13b have been eliminated and each stub axle of the suspension, or another part of the suspension, is provided with its own localized caliper unit having its localized hydraulics. More specifically, the stub axle or suspension 200 is provided with a small reservoir or hollow portion 202 in a stub axle with a fluid connection, such as a bore hole 204 in the stub axle leading to the hydraulic cylinder 72 to operate the piston to slide the slidable brake pads 50, 54 and 56 to force the outer brake disc into clamping engagement with the outer, fixed brake pad, as described above.

To maintain the desired hydraulic pressure in the small cylinder 200 on the suspension 200, a pressure generator device 206 (FIG. 1E) is mounted on and attached to the reservoir, and the energy used to increase the hydraulic pressure in the reservoir is derived from the mass of the vehicle as it bounces up and down. More specifically, the dampening system for the vehicle wheel including shock absorbers or the like are used to actuate a pressure generator device. For instance, a plunger 210 is mounted to be pushed by the vehicle mass to move a diaphragm 212 in the reservoir 202 to increase the pressure to the desired constant pressure, e.g., 20 BAR. Currently, there are air rides or cushions in vehicles that use the mass of the vehicle to increase air pressure in these kinds of dampening systems and similar devices may be used as a pressure generator for the hydraulic fluid in the reservoir 202.

To provide the ABS control for the ABS Braking System 200 preferably includes its own ABS controller, such as in the form of a computer chip 214 or the like, mounted on the stub axle along with a pressure control or modulating valve unit 215. Additionally, a small control valve 216 for the ABS controller is provided on the suspension of each wheel to control the hydraulic pressure and actuation of the piston in the cylinder 72 to decelerate the wheel and to release hydraulic pressure to allow the wheel to accelerate toward the vehicle velocity. The preferred, hydraulic, control valve unit 215 has a modulating valve including a plunger 217 operating in a fluid filled chamber 218 and by sliding the plunger forwardly to reduce the volume in the chamber 218 the pressure is increased in the cylinder 72. Conversely, by pulling the plunger 217 rearwardly the volume in the chamber is increased and the hydraulic pressure in the brake cylinder 72 is reduced. The plunger 217 is shifted either in predetermined increments of travel or in infinite travel amounts by a solenoid 220 having a solenoid rod 221 for reciprocating in the solenoid case. The solenoid rod 221 has one end attached to the plunger. The solenoid is operated by the ABS controller 214. In contrast to the conventional system having a modulating valve 17 (FIG. 1), the modulating valve 215 sees a positive pressure from the reservoir rather than stopping fluid inflow through a check valve connected to the master cylinder.

What is claimed is:

1. A vehicle wheel brake system for a wheel suspension assembly and having an anti-lock braking system ("ABS") to provide a higher resolution brake apply and brake release relative to an ABS system having a single, fixed brake disc, the brake system comprising:

a mounting hub for a road wheel mounted on the wheel suspension assembly for rotation about a rotational axis;

at least two slidable brake discs mounted to slide axially along the hub between braking and off-brake positions;

a caliper including a fixed bridge and at least four (4) braking pads mounted on the fixed bridge to provide four braking surfaces for braking engagement with the opposing sides of each of the brake discs;

a pulse creator mounted on the hub for generating pulses;

a sensor mounted on the wheel suspension assembly for sensing pulses from the pulse creator and for providing signals with respect to the rotational condition of the road wheel;

an ABS controller connected to the sensor and providing signals when the wheel condition is within preset parameters relative to the speed of the vehicle to develop a theoretical deceleration curve for the stopping of the vehicle within a predetermined distance; and a brake actuator system operable manually by the vehicle passenger and operable automatically by the ABS controller to operate the caliper to slide the brake discs axially and to cause application of the four brake pads at a pressure of about one-half or less of the pressure of operation of the fixed, brake disc system and a frequency of brake apply and release of at least double the frequency of brake apply and release of the fixed, brake disc system.

2. A vehicle wheel system in accordance with claim 1 wherein a hollow bore is formed in the suspension member to reduce the weight of the suspension member and to contain the force applicator at a location closer to a wheel-turning axis to allow a reduction in turning radius.

3. A vehicle wheel ABS braking system in accordance with claim 1, having reduced residual torque drag, comprising:

springs between the hub and inner portions of the slidable brake discs to mount the brake discs in a floating manner on the hubs; and springs on the fixed caliper for holding the brake pads in position relative to the brake pads during vehicle wheel speed-up.

4. A vehicle wheel ABS braking system in accordance with claim 1 having reduced weight and reduced residual drag torque, comprising:

a hollow, cylindrical bore formed in the suspension member having a force actuator contained therein;

springs floating and supporting the slidable brake discs on the hub; and springs on the caliper for engaging the slidable brake pads and for holding them in position relative to the slidable brake discs in the off-brake position to reduce residual torque drag therebetween.

5. A vehicle wheel braking system, in accordance with claim 1, wherein the brake actuator system comprises:
an integral, hydraulic cylinder for holding a hydraulic fluid integrally formed in a suspension member of the wheel suspension; and
a piston mounted in the integral hydraulic cylinder and is operable by the hydraulic system to engage the four brake pads with the two axially, slidable brake discs.

6. A vehicle wheel ABS braking system, in accordance with claim 1, wherein the brake pad actuator comprises a solenoid and an electrical system for selectively energizing and de-energizing the solenoid.

7. A vehicle wheel ABS braking system, in accordance with claim 1, wherein the brake actuator comprises:
a hydraulic system having a hydraulic cylinder at each wheel;
a hydraulic reservoir for containing hydraulic fluid at each of the ABS-controlled brake pads to supply hydraulic fluid to an adjacent, hydraulic cylinder; and
a pressure generator at each wheel suspension operable by the mass of the vehicle for pressuring the hydraulic fluid in each hydraulic reservoir.

8. A vehicle wheel ABS braking system, in accordance with claim 1, wherein the pulse generator comprises a ring of spaced generator elements mounted on a side of the rotatable hub; and
the sensor comprises a magnetic sensor disposed on the suspension member closely adjacent the ring of spaced generator elements.

9. A vehicle wheel ABS braking system, in accordance with claim 1, wherein the caliper is mounted on the suspension member in a vertical plane through the rotational axis and above the rotational axis and a radially outer position relative to the rotational axis; and
the pulse generator and the sensor are located radially inwardly of the caliper.

10. A vehicle disc brake and suspension system having an ABS system comprising:
a wheel suspension member having a hub and connections to other portions of the vehicle steering device;
at least two brake discs each having an inner portion slidably mounted on the hub for sliding in a direction parallel to the central axis of the hub between a braking position and off-brake position;
at least four braking pads including one outer, fixed, brake pad and at least three slidable brake pads each having a friction pad surface for applying braking torque to opposite sides of the brake disc when in the braking torque position to decelerate the engaged brake discs;
a hollow bore in the suspension member;
an actuator in the hollow bore of the suspension member for sliding the slidable brake pads and brake discs into the braking position;
force applicators for floating the brake discs to allow them to slide axially from a braking position to an off-braking position relative to the braking pads;
an outer rim portion on the braking disc rotating while in the off-brake position and engaging the slidable brake pad's friction surface to slide the pad from the braking position to an off-brake pad position;
a caliper fixed to the suspension member and having slidable brake pads thereon operable by the actuator into braking engagement with the slidable brake discs;
a brake pad force applicator acting on the slidable brake pads, when its off-brake position, to constrain the friction pad surfaces engaging the brake disc to reduce tilting of the brake pads on the stationary support and its rubbing on the brake discs that would increase off-brake, residual torque; and
an ABS system for operating the brake pad force applicator within the hollow bore in the suspension member to slide the brake pads and brake discs iteratively to the braking position and releasing the brake pads and discs to slide to off-brake positions.

11. A vehicle ABS brake system, in accordance with claim 10, wherein the actuator for sliding the brake pads comprises a hydraulic cylinder and a piston in the cylinder for applying the brake pads at 40 BAR or less when the vehicle is on a high coefficient of friction road surface.

12. A vehicle ABS system, in accordance with claim 10, wherein the actuator for sliding the brake pads comprises a solenoid and an electrical system to operate the solenoid.

13. The vehicle ABS braking system, in accordance with claim 10, wherein the brake pad force applicator acts on the slidable brake pads, when the system is in an off-brake position to constrain the friction pad surfaces from engaging the brake discs and to reduce tilting of the brake pads and rubbing on the brake discs that increases off-brake, residual torque.

14. A disc brake system, in accordance with claim 13, wherein the brake pad force applicator applies force to each slidable brake pad to hold its face in a plane substantially parallel to the plane in which the disc is rotating to minimize tilting of the brake pad into engagement with the brake discs, which would cause disc thickness variation.

15. A disc brake system, in accordance with claim 14, wherein the brake pad force applicator comprises at least one spring pushing on the brake pads in a direction substantially normal to the rotational axis of the brake discs and normal to the path of travel of the brake pads along a stationary support.

16. A disc brake system, in accordance with claim 10, wherein a stationary support comprises a bridge;
the slidable brake pad comprises a slidable pad carrier mounted for sliding on the bridge and carrying the frictional pad surface thereon; and
the brake pad force applicator is positioned over the brake pad carrier and forces the brake pad carrier downwardly against the bridge.

17. A vehicle wheel suspension system having an ABS braking system comprising:
a suspension member;
at least one brake disc mounted on the suspension member for rotation with a wheel of the vehicle,
brake pads mounted on the suspension member for movement to a brake application position to engage the at least one brake disc to decelerate the wheel and for movement to a brake release position to allow the wheel to accelerate during an ABS braking operation;
a localized hydraulic system at each of a plurality of wheels without connection to a master cylinder for shifting the brake pads to the brake application position and for allowing the brake pads to shift to the brake release position;
a hydraulic reservoir mounted on the suspension at each wheel for containing hydraulic fluid;
a pressure generator at each wheel suspension independent of a connection to a master cylinder for an associated hydraulic reservoir operable by the vehicle mass movement to increase pressure in the reservoir; and an ABS control system including an electrically operated actuator at each wheel suspension for operating the localized hydraulic system at each wheel suspension to iteratively shift the brake pads into the brake application position with vehicle wheel acceleration with intervals therebetween of wheel acceleration to stop the vehicle.

18. A vehicle suspension and ABS braking system, in accordance with claim 17, wherein the at least one brake disc comprises a pair of brake discs slidable mounted on the hub; and wherein four brake pads are mounted on the suspension member to engage four faces of the pair of brake discs.

19. A vehicle suspension and ABS braking system, in accordance with claim 17, wherein the hydraulic system comprises:

an integral, hollow cylinder formed in a stub axle suspension member; and a piston mounted in the integral, hollow cylinder.

20. A vehicle suspension and ABS braking system, in accordance with claim 17, wherein the ABS control system comprises an intelligent control located at each wheel for controlling that wheels iterative brake application and brake release.

21. A method of braking a vehicle wheel using an ABS system having an ABS hydraulic system and an ABS controller, and a wheel brake having a caliper and at least two of slidable brake discs axially slidable on a rotatable wheel supporting hub and having at least four brake pads engageable with the brake discs, the method comprising:

operating the caliper to a braking position using 40 BAR or less of hydraulic fluid pressure to slide the brake pads and the slidable brake discs to a braking position;

releasing the hydraulic fluid to allow the slidable brake discs to slide axially on the hub and to engage the slidable friction pads and to push them to their off-brake positions;

floating the brake discs and the brake pads on their respective supports in the off-brake position to reduce off-brake frictional drag and tilting of this brake pads against the brake discs;

sensing operation of a brake pedal by the operator generating an excessive braking force and sensing wheel speed and an approaching lock up of the road wheel using an ABS controller;

activating the ABS hydraulic system by the ABS controller to shift the slidable brake pads on the fixed caliper with hydraulic pressure at 40 BAR or less; and shifting slidable brake pads and slidable brake discs on their floating supports rapidly to the braking position with changes in pressure from 40 BAR and at a predetermined frequency in accordance with a stored algorithm in the ABS system.

22. A method of braking, in accordance with claim 21, including a reduction of weight of the system by forming a hollow, cylinder actuator bore in the suspension.

23. A method of braking, in accordance with claim 21, including positioning the caliper at about a 12:00 o'clock position and above the rotating hub.

24. A method, in accordance with claim 21, including operating the piston within an integral cylinder at the top of the suspension member.

25. A method, in accordance with claim 21, including operating the caliper by the ABS controller in the ABS mode at 40 BAR or less pressure on a high, co-efficient of friction road surface and at a substantially higher frequency than a system operating at about 70 BAR or more pressure on the same high coefficient of friction road surface.

26. A method, in accordance with claim 25, including the step of operating the brake pads to engage and release the brake discs within the range of 8–20 Hertz for a low, coefficient of friction road surface.

* * * * *